United States Patent
Xie et al.

(10) Patent No.: US 11,910,974 B2
(45) Date of Patent: Feb. 27, 2024

(54) CONVEYOR STATIONS FOR EMPTYING DEBRIS COLLECTING ROBOTS

(71) Applicant: ViaBot Inc., Sunnyvale, CA (US)

(72) Inventors: Fei Xie, Palo Alto, CA (US); Dawei Ding, Palo Alto, CA (US); Gregg Ratanaphanyarat, Palo Alto, CA (US)

(73) Assignee: ViaBot Inc., Sunnyvale, CA (US)

( * ) Notice: Subject to any disclaimer, the term of this patent is extended or adjusted under 35 U.S.C. 154(b) by 195 days.

(21) Appl. No.: 17/193,475

(22) Filed: Mar. 5, 2021

(65) Prior Publication Data

US 2022/0104676 A1    Apr. 7, 2022

Related U.S. Application Data

(60) Provisional application No. 63/087,179, filed on Oct. 3, 2020.

(51) Int. Cl.
*A47L 11/40* (2006.01)
*A47L 11/24* (2006.01)
(Continued)

(52) U.S. Cl.
CPC .......... *A47L 11/4025* (2013.01); *A47L 11/24* (2013.01); *A47L 11/4005* (2013.01);
(Continued)

(58) Field of Classification Search
CPC .......... A47L 2201/02; A47L 2201/024; A47L 2201/026; A47L 2201/00; A47L 2201/028;
(Continued)

(56) References Cited

U.S. PATENT DOCUMENTS 2,264,332 A * 12/1941 Peterson .............. B65G 17/126
                                                        198/713
4,795,103 A *  1/1989 Lech .................... B02C 13/04
                                                        241/101.76
(Continued)

FOREIGN PATENT DOCUMENTS

CN     107512526 A  * 12/2017
CN     108643096 A  * 10/2018
KR     100715774 B1 *  5/2007

OTHER PUBLICATIONS

Translation of CN-107512526-A (Year: 2017).*
Translation of CN-108643096-A (Year: 2018).*
Translation of KR 100715774 B1 (Year: 2007).*

*Primary Examiner* — Don M Anderson
*Assistant Examiner* — Steven Huang
(74) *Attorney, Agent, or Firm* — Penilla IP, APC

(57) ABSTRACT

A conveyor station, robot module, sweeper module, and methods for autonomously emptying debris using the conveyor station are described. In one example, a conveyor station includes a housing having an input end and an output end. The conveyor station includes a conveyor belt having a receiving region proximate to the input end and an angled transport region leading toward a dispense region. The conveyor belt has a plurality of fins that extend out from a surface of the conveyor belt. The plurality of fins enable movement of debris collected at the receiving region toward the dispense region. The dispense region is configured to push debris into a drop funnel of the housing, and the drop funnel directs debris into a receptacle. The conveyor station includes a conveyor controller of the conveyor station is configured with a sensor for detecting presence of a sweeper module. The sweeper module includes a container that holds debris collected when the sweeper module is connected to a robot module. The debris is configured to be emptied from (Continued)

said sweeper module directly onto said receiving region of the conveyor belt.

17 Claims, 13 Drawing Sheets

(51) Int. Cl.
    *B60P 1/04*     (2006.01)
    *B65G 43/00*     (2006.01)
    *B65G 47/16*     (2006.01)
    *G05D 1/02*     (2020.01)
    *G05D 1/00*     (2006.01)
    *B02C 23/02*     (2006.01)

(52) U.S. Cl.
    CPC ....... *A47L 11/4011* (2013.01); *A47L 11/4091* (2013.01); *B60P 1/04* (2013.01); *B65G 43/00* (2013.01); *B65G 47/16* (2013.01); *G05D 1/0225* (2013.01); *A47L 2201/022* (2013.01); *A47L 2201/024* (2013.01); *B02C 23/02* (2013.01); *G05D 2201/0215* (2013.01)

(58) Field of Classification Search
    CPC ........... A47L 2201/022; A47L 11/4025; A47L 11/283; A47L 11/24; A47L 11/4011; A47L 11/4091; A47L 9/149; A47L 9/1481; A47L 9/1472; E01H 1/047; E01H 1/053; B65G 15/42; B65G 19/14; B65G 41/007; B65G 41/008; B65G 47/16; B65G 43/00; A01D 34/008; A01D 42/06; A01D 43/06; A01D 43/0635; A01D 43/077; A01D 46/30; A01D 90/105
    USPC ...................................... 198/311, 716, 699.1
    See application file for complete search history.

(56) References Cited

U.S. PATENT DOCUMENTS

| | | | | |
|---|---|---|---|---|
| 5,293,986 | A * | 3/1994 | Mouritzen | B65G 43/10 198/575 |
| 6,389,862 | B1 * | 5/2002 | Kusters | B21H 8/005 72/197 |
| 2016/0183752 | A1 * | 6/2016 | Morin | A47L 9/009 15/340.1 |
| 2018/0155131 | A1 * | 6/2018 | Wilcox | B65G 15/00 |
| 2019/0017796 | A1 * | 1/2019 | Whiting | B02C 19/0056 |
| 2019/0367292 | A1 * | 12/2019 | Aga | G01G 11/003 |
| 2020/0033883 | A1 * | 1/2020 | Theobald | G05D 1/0268 |

* cited by examiner

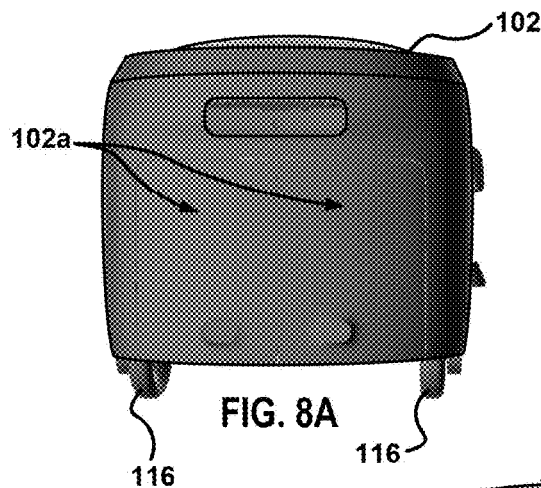
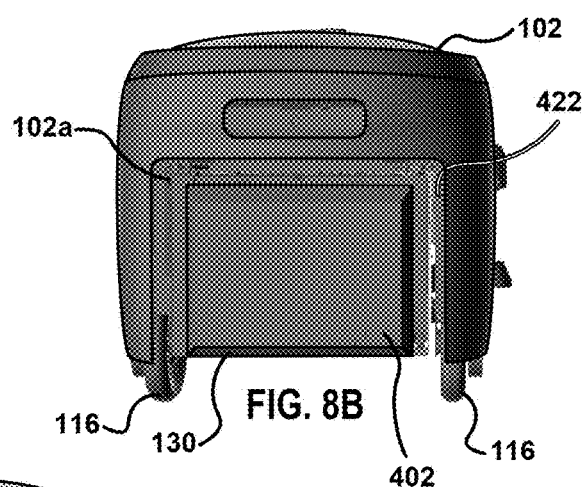
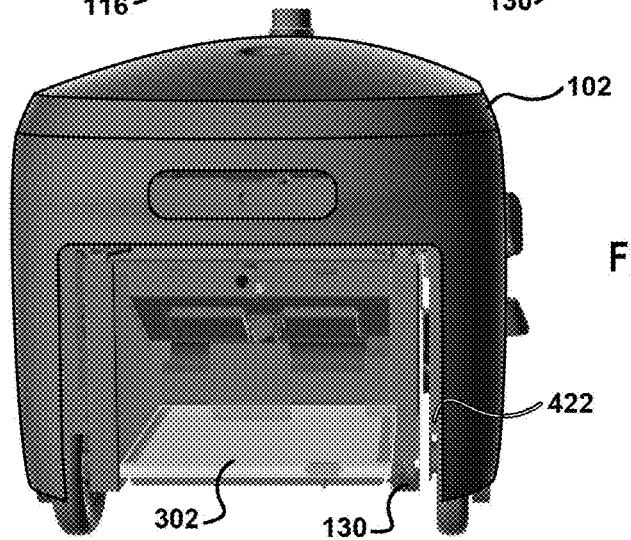
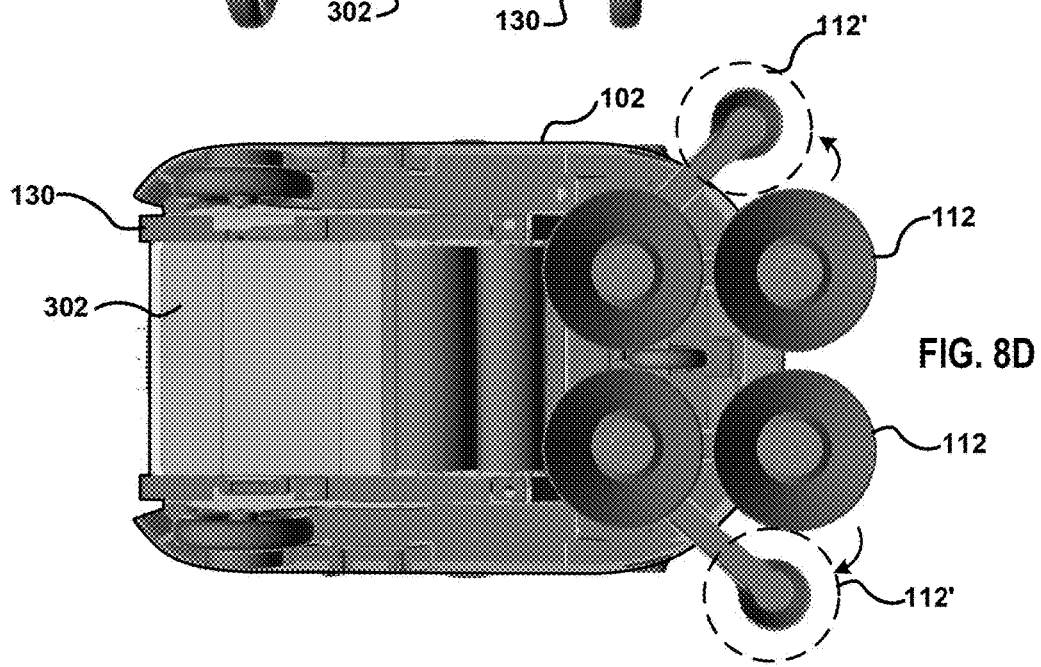

CONVEYOR STATIONS FOR EMPTYING DEBRIS COLLECTING ROBOTS

CLAIM OF PRIORITY

This application claims priority to U.S. Provisional Patent Application No. 63/087,179, filed on Oct. 3, 2020, and entitled "Autonomous Modular Sweeper Robot and Dock System," which is hereby incorporated by reference.

RELATED APPLICATIONS

This application is related to U.S. patent application Ser. No. 16/247,482, filed on Jan. 14, 2019, and entitled "Autonomous Modular Robot," which is a Continuation of U.S. patent application Ser. No. 15/152,100, filed May 11, 2016 (U.S. Pat. No. 10,180,685, issued on Jan. 15, 2019), entitled, "Autonomous Modular Robot", wherein U.S. patent application Ser. No. 15/152,100 is a continuation-in-part of U.S. patent application Ser. No. 14/937,633, filed Nov. 10, 2015, entitled "Modular Robot", and claims the priority benefit under 35 U.S.C. § 119(e) of U.S. Provisional Patent Application No. 62/160,059, filed May 12, 2015; and U.S. Provisional Patent Application No. 62/200,814, filed Aug. 4, 2015, the disclosures of which are herein incorporated by reference.

FIELD

The present disclosure relates generally to systems for facilitating emptying of an autonomous robot using for sweeping or collecting debris from surfaces, and more particularly, conveyor stations used for moving debris into debris collection receptacles.

BACKGROUND

Autonomous robots are becoming increasingly prevalent due to their ability to automatically perform a variety of tasks that are typically performed manually by humans, or that have been performed with direct human control of a robot. A simple example of an autonomous robot is a robotic floor cleaner such as a robotic vacuum or a robotic mop. These robots are often programmable, allowing users to configure operation times, frequency of operation, and various other settings for the robots. Once programmed, the robots may perform a task, move, and interact with the surrounding environment without requiring further human input. While such robots are becoming more prevalent, the robots are often designed to perform only a single function, such as to clean a surface. As a result, performing a variety of tasks may be difficult and/or prohibitively expensive due to the need to acquire a dedicated autonomous robot for each task that the user wishes to complete. Further, most robots are not designed to be automatically serviced once completing their task, which requires human interaction at various stages of use.

It is in this context that embodiments of the disclosure arise.

SUMMARY

Methods, systems, and computer systems are provided for operating a conveyor station used for emptying a sweeper module of a robot module. When a robot module is engaged with a sweeper module, the sweeper module is used to sweep surfaces and collect trash and debris picked up at designated areas identified for cleaning. The sweeper module has a container region within it that eventually becomes full. When this happens, the robot module autonomously moves to a location where the sweeper module can be emptied, and the debris removed into the appropriate receptacle, e.g., a trash can, a dumpster or a container. In one embodiment, a conveyor station is provided, which includes a conveyor belt. The conveyor belt is designed at one end to interface with the sweeper module and at the other end to interface with a trash receptacle.

The conveyor station, in one embodiment, also includes a dust cover that is designed to reduce dust debris created when the sweeper module is emptied. In one configuration, the robot module includes a sweeper conveyor that is designed to assist the sweeper module to remove debris collected in the receptacle within the sweeper module. Accordingly, as the sweeper conveyor turns, debris from within the sweeper module is directed over the conveyor belt of the conveyor station, when the sweeper module is interfaced with the conveyor station at a docking station. By way of example, a docking station is configured for guiding the robot module to interface with the conveyor station.

Once the robot module has moved over the docking station, the robot module is interfaced with the conveyor station proximate to a dust cover. In this manner, the robot module can autonomously move toward the docking station, and interface with the docking station for emptying debris to the conveyor station. The conveyor station will therefore route debris removed from the sweeper module to a location where the debris can be emptied into a trashcan or receptacle, e.g. a dumpster. In one embodiment, the conveyor station has a housing that is designed to house the conveyor belt and assist in moving the debris to a location where it can be emptied off of the conveyor belt, and dropped into the trash can.

In one configuration, a shredder system can be connected within the conveyor station to enable shredding of debris before the debris is emptied into the trash can. By providing an optional shredding station, the breeze removed from the sweeper module can be more compactly contained, and thus enable more trips of the robot module for emptying the container of the sweeper module during cleaning operations of a location, or parking lot, or building, or street, or parking garage, etc.

In one embodiment, a conveyor station is disclosed. The conveyor station includes a housing having an input end and an output end. The conveyor station includes a conveyor belt having a receiving region proximate to the input end and an angled transport region leading toward a dispense region. The conveyor belt has a plurality of fins that extend out from a surface of the conveyor belt. The plurality of fins enable movement of debris collected at the receiving region toward the dispense region. The dispense region is configured to push debris into a drop funnel of the housing, and the drop funnel directs debris into a receptacle. The conveyor station includes a conveyor controller of the conveyor station which is configured with a sensor for detecting presence of a sweeper module. The sweeper module includes a container that holds debris collected when the sweeper module is connected to a robot module. The debris is configured to be emptied from said sweeper module directly onto said receiving region of the conveyor belt.

In some implementations, the conveyor system includes a shredder system connected between the drop funnel and the output end, such that debris received off the dispense region of the conveyor belt flow into the drop funnel and are shredded before exiting said output end that is disposed over the receptacle.

In some implementations, the housing includes wheels for movement of the housing to a location of operation.

In some implementations, the conveyor system includes a dust cover of the housing. The dust cover is disposed over the receiving region of the conveyor belt, and said dust cover defines an enclosure surrounding a portion of said receiving region of the conveyor belt.

In some implementations, the conveyor controller is interfaced with a power controller. The power controller is configured to provide power to the sweeper module when the sensor detects said presence of the sweeper module, and said sweeper module includes a sweeper module controller that communicates with said conveyor controller and a robot controller and said robot module.

In some implementations, the conveyor system includes a docking station. The docking station is configured to connect with the housing of the conveyor station, and said sweeper module is configured to connect to the docking station when the sweeper module is placed over the docking station by the robot module.

In some implementations, the sweeper module is connected to the docking station, a sweeper module controller is interfaced with a conveyor controller and power is provided to the sweeper module by a power controller of the conveyor station.

In some implementations, the sweeper module includes a sweeper conveyor disposed at a base of the sweeper module. The sweeper module includes a sweeper door that is configured to open to enable the sweeper conveyor to move debris from the container inside the sweeper module directly over the receiving region of the conveyor belt of the conveyor station.

In some implementations, the conveyor controller is configured to activate rollers of the conveyor belt in response to exchanging control data with a sweeper module controller, such that the sweeper module controller is configured to move the sweeper conveyor when the conveyor belt of the conveyor station is moving, such that debris in the container are moved out of the container and onto the receiving region of the conveyor belt.

In some implementations, the conveyor system includes a docking station connected to the housing of the conveyor station. The docking station including a track for guiding wheels of the robot module onto the docking station for dropping off the sweeper module for emptying or collecting the sweeper module for continuation a next sweeping operation.

In some implementations, the housing has a lower region proximate to the input end and an elevated region proximate to the output end, the elevated region of the housing provides for receptacle region for locating a collection container.

In some implementations, a fullness sensor is located proximate to the output for detecting a level of fullness of said receptacle.

In some implementations, the sweeper module includes a sweeper conveyor disposed at a base of the sweeper module, and said sweeper conveyor is configured with a tilt mechanism to facilitate movement of said debris out of the container of the sweeper module.

In some implementations, the sweeper module includes a sweeper conveyor disposed at a base of the sweeper module. The sweeper conveyor incues a surface that is one of a smooth surface, a beaded surface, a rough surface, a ridged surface, a fined surface or a surface with geometric structures designed to push said debris out of the container of the sweeper module.

In some implementations, the sweeper module includes one or more blowers of air that are activated to push said debris out of the container of the sweeper module and onto said receiving region of the conveyor belt of the conveyor station.

In one embodiment, a robot module is disclosed. The robot module includes a sweeper module having a container for collecting debris from a surface of a location. The sweeper module is coupled to one or more brushes for contacting the surface and moving said debris into said container. Included is a robot module having wheels and configured to couple to the sweeper module. The robot module is enabled for autonomous movement and corresponding movement of the sweeper module over the surface. A controller is integrated with the robot module and interfacing with the sweeper module. The controller is configured to execute instructions for assigning of at least two zones at the location and assigning a work function to be performed using the sweeper module at each of the at least two zones. The controller is further configured for programming the robot module to activate the sweeper module in each of the two zones. The assigned work function is set for performance at each of the at least two zones.

In some implementations, the work function can be to sweep, to scrub, to polish, to mow or to perform different work functions over zones of a location, and providing remote access to view real-time operation of the robot module, and to program zones and other control parameters of the robot module. In some implementations, the robot module includes a plurality of cameras for providing computer vision, and a global positioning system (GPS). The controller is configured to use information from the plurality of cameras and the GPS for controlling said autonomous movement of the module robot. The computer vision is used to avoid obstacles detected at the location. In some implementations, the controller accesses calibrated mapping data for the location to enable the autonomous movement at the location.

The foregoing is a summary of certain embodiments in accordance with implementations of the disclosure. It will be appreciated that other embodiments and implementations will be realized upon a full understanding of the present disclosure.

BRIEF DESCRIPTION OF THE DRAWINGS

FIGS. 8A-8D illustrate rear views of the robot module, in accordance with one embodiment.

Figure 1:
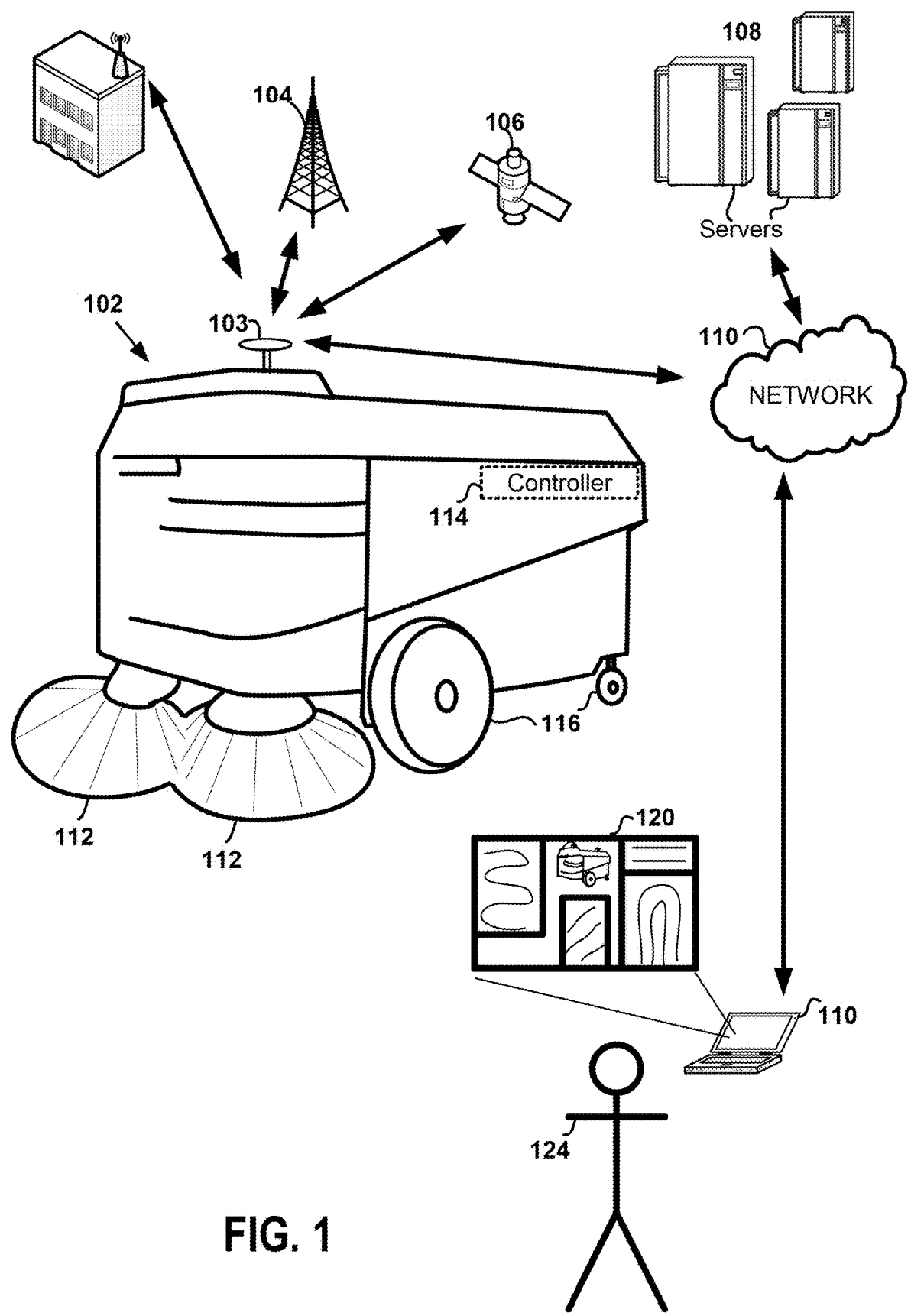
FIG. 1 illustrates a high level diagram of a robot module that is designed for a sweeping work function, in accordance with one embodiment.

The drawings are provided to illustrate examples of embodiments and are not intended to limit the scope of the disclosure. In addition, features in the drawings are not necessarily to scale.

DETAILED DESCRIPTION

Methods and systems for controlling operation by autonomous modular robots are disclosed. The methods include hardware and/or software systems that are used to interface with and control operation of an autonomous modular robot that is programmed to perform as task. Broadly speaking, the autonomous modular robot may be referred to by a number of names, such as, the robot, the modular robot, the sweeper, the scrubber, the autonomous vehicle, the vehicle, the cutter, the mower, the autonomous unit, and other similar names. The modular robot can therefore be configured to perform different tasks, or work functions. These tasks can include, without limitation, ground cleaning, floor source cleaning, ground scrubbing, ground vacuuming, sweeping of paved surfaces (e.g. parking lots, buildings, roads, etc.), or other types of outdoor or indoor surfaces or spaces. In one example, the modular robot may be configured for sweeping. Such a configuration may include a robot, a sweeper module, and a dock assembly.

The robot is mobile (e.g., has wheels or tracks), and is configured to engage and retain the sweeper module, and maneuver the sweeper module over a given surface to be cleaned. The sweeper module is a modular unit having brushes that sweep debris from the surface into an included collection container. If the work function is to scrub a surface, a scrubber module may be picked up by the robot instead of a sweeper module. The same applies to a mower module, which can be picked up from a respective docking station to enable mowing of a lawn, shrubs, or grass.

In accordance with one embodiment, the conveyor station 202 is provided that provides for a way of the robot module 102 to empty directly onto a conveyor of the conveyor station 202 and directing debris into a trash receptacle. In one embodiment, the robot module 102 is engaged with a sweeper module 130 that is configured for sweeping and collecting debris over surfaces as described above. When the container inside the sweeper module 130 becomes full or needs emptying, the robot module 102 can move autonomously to find its position to align with the conveyor station 202 and a conveyor belt 210 of the conveyor system 202. Once aligned, a door 404 of the sweeper module 130 opens so that a sweeper conveyor inside the sweeper module 130 can push debris out and onto a surface of the conveyor belt 210 of the conveyor system 202. The conveyor system 202 is designed with the conveyor belt 210 that can direct debris along the path that allows for funneling of the debris into a trash receptacle. In one embodiment, a portion of the conveyor belt 210 is oriented at an angle so that debris received from the sweeper conveyor 302 can be moved up the conveyor toward a final that pushes the debris into a receptacle, e.g. a garbage can or dumpster. In one embodiment, a shredder system is provided to shred or grind material before it is moved into the receptacle, thus reducing the volume of the material and extending the cycle time between emptying of the receptacle.

These and other features described herein will not be further described with reference to the following drawings.

FIG. 1 illustrates a high level diagram of a robot module 102 that is designed for a sweeping work function, in accordance with one embodiment. As shown, the robot module 102 includes brushes 112, which are utilized to sweep debris collected from surfaces, such as parking lots, hard surfaces, buildings, and the like. In one embodiment, the robot module 102 includes a sweeping module (not shown) which is contained within the robot module 102, and the sweeping module is connected to the brushes 112. For more information on the modular interface between the robot module 102 and the sweeping module, reference may be made to U.S. Provisional Patent Application No. 63/087, 179, filed on Oct. 3, 2020, which is herein incorporated by reference. The robot module 102 includes one or more antenna 103, which is used by the robot module 102 to communicate wirelessly with one or more different types of communication devices. In one embodiment, the antenna 103 can include the communications device for communicating with the network 110.

The communications device can be an Ethernet controller that allows for Wi-Fi or cellular connection to the network 110. In some embodiments, high-speed cellular can be utilized for the communication, such as 5G communication. In some embodiments, the antenna 103 can be configured to communicate with a cell tower 104, or multiple cell towers 104 for enabling the communication with the network 110. In some embodiments, the GPS transponder can be provided in the robot module 102, to enable communication with a global positioning system (GPS) device 106. The robot module 102 may also communicate with local GPS 106a, for higher precision economist movement. Broadly speaking, GPS coordinates obtained from a GPS 106 may not provide sufficient precision and movement when the robot module 102 is required to perform fine tune movements, based on the work function.

The local GPS 106a, for example, may be installed at the location where the robot module 102 is to perform its work function. As mentioned above, mapping data can be generated for a location to enable the robot module 102 to move efficiently about the location in which the work function is to be performed. Network 110 is shown communicating with servers of a data center 108. The servers 108 may be replicated among one or more data centers depending on the location of the robot module 102 and the desired communication with those robots. For example, robot modules 102 operating in California may utilize local region data centers 108, and robot modules 102 operating in New York may utilize local region data centers 108 to reduce delay. As will be described in greater detail below, the servers of the data center may be utilized to communicate instructions to the robot modules 102. The instructions provided to the robot module 102 can include information for defining zones at specific locations, where the robot module 102 is to perform its work function.

The instructions can be custom tailored by the manager of the location where the robot module 102 is to perform its work function. In some embodiments, the manager is the user 124, which has access to a computer 110 for visualizing the location where the work function is to be performed. The user interface 120 may be provided which highlights the layout of the location, and allows for the user 124 to customize the zones to be used to perform the work functions. The robot module 102 is shown to include wheels 116 to enable the robot module 102 to function in its autonomous movement. The autonomous movement of the robot module 102 can be customized based on a schedule, and can be customized to allow the user 124 to define different work functions to be performed in different zones of a location being managed. The controller 114 of the robot module 102 includes electronics that provide for autonomous movement of the robot module 102, and interfacing with electronics of the sweeper module being used by the robot module 102.

The robot module 102 includes batteries to enable electric vehicle movement and operation, and the sweeper module included in the robot module 102 will also include batteries for providing power to perform the work function. In one embodiment, the robot module 102 is configured to be docked at a docking station, where the robot module and its batteries can be charged.

Figure 2A:
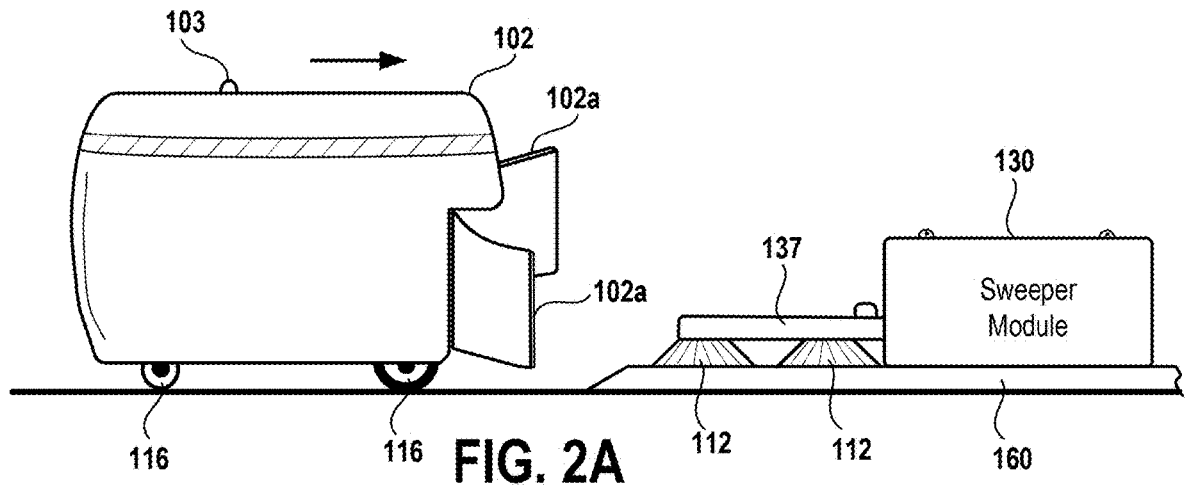
FIGS. 2A-2C illustrates an example of the robot module approaching the sweeper module for connection therewith, in accordance with one embodiment.
Figure 2B:
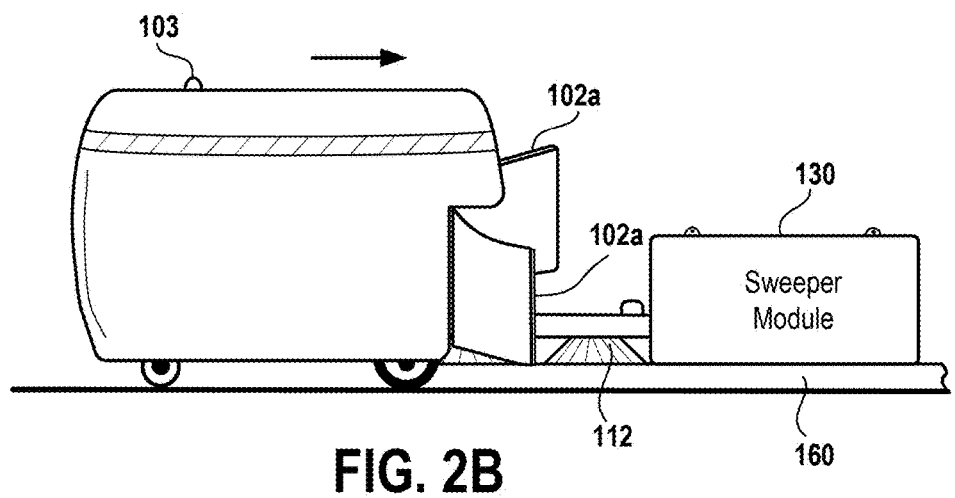
Figure 2C:
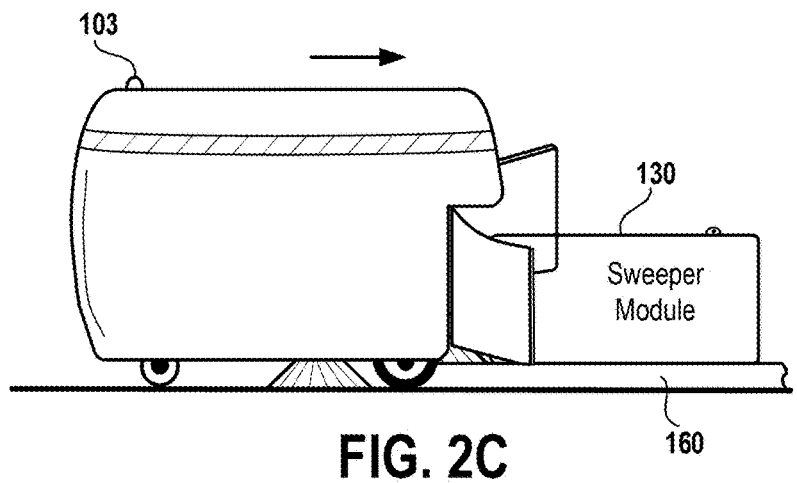

FIGS. 2A-2C illustrates an example of the robot module 102 approaching the sweeper module 130 for connection therewith, in accordance with one embodiment. As shown, the robot module 102 will autonomously guide itself to align with the docking station 160, which currently is connected to sweeper module 130. The robot module 102 uses one or more of a number of guiding technologies for autonomous movement, such as GPS, local GPS, cameras for vision assisted movement, LIDAR, radar, or combinations of two or more thereof. As the robot module 102 moves, it guides itself onto the docking station 160, such that an open space within the robot module 102 allows the sweeper module 130 to fit within the open space. As shown, doors 102a of the robot module 102 may open to allow the sweeper module 130 to fit within the open space of the robot module 102 as shown in FIGS. 2B and 2C. For example, as the wheels 116 of the robot module 102 move the robot module 102 onto the docking station 160, guides formed on the docking station 160 will ensure that the robot module 102 moves over the sweeper module 130. In this format, the sweeper module 130 is able to fit and align within the open space of the robot module 102.

Figure 3A:
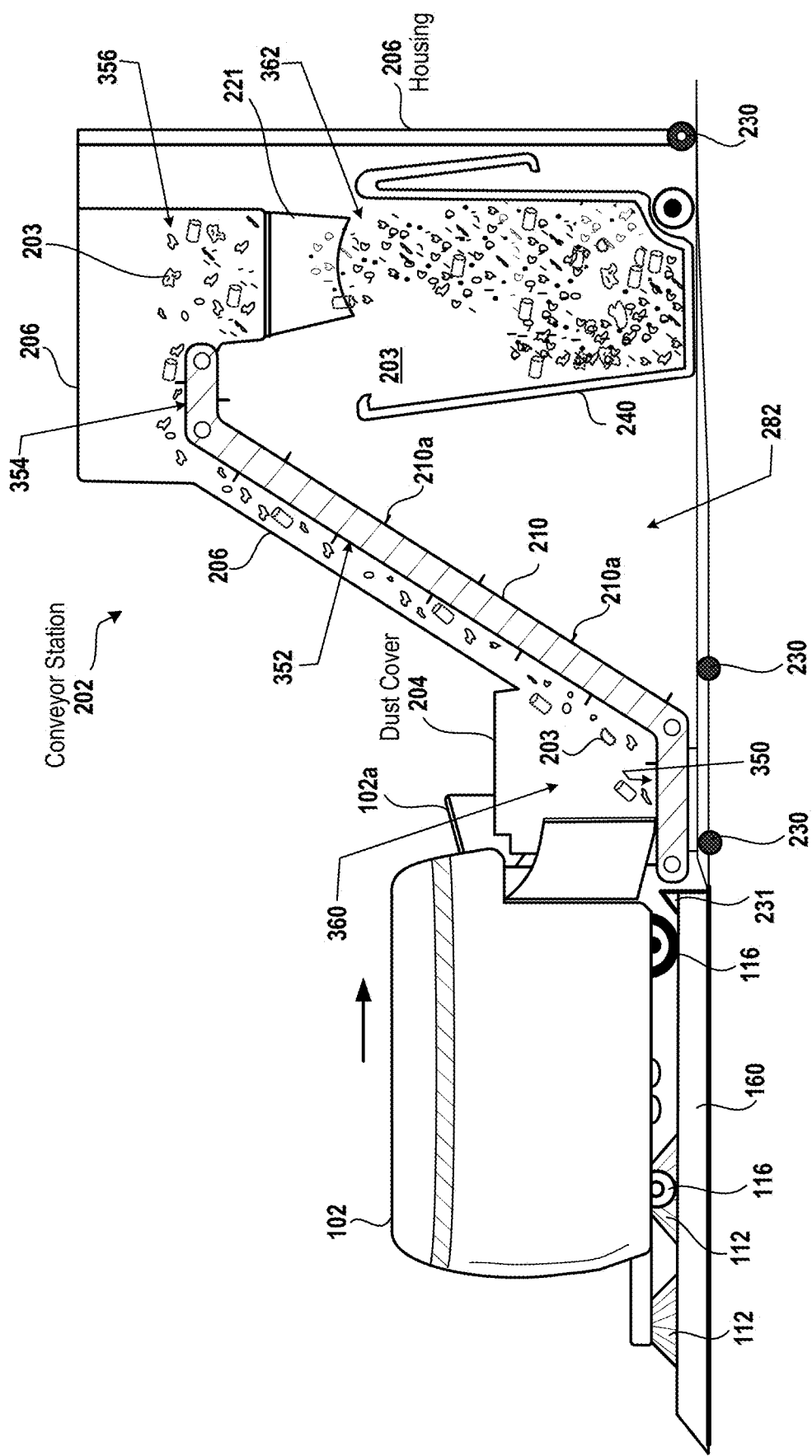
FIG. 3A illustrates an example of the robot module placed in a docking position over the docking station, in accordance with one embodiment.

FIG. 3A illustrates an example of the robot module 102 placed in a docking position over the docking station 160. The robot module 102 maintains its doors 102a open, as it moves closer to the end of the docking station 160 and the front wheels 116 hit a stop 231 located at the end of the docking station. In this configuration, the conveyor station 202 is shown coupled to the docking station 160, such that robot module 102 and its associated sweeper module 130 can empty any of the collected debris and drop it over a conveyor belt 210 of the conveyor station 202. Broadly speaking, the conveyor station 202 is configured to receive debris that is emptied from the sweeper module 130 onto a surface of the conveyor belt 210. The conveyor belt 210 is configured to then move debris 203 between an input and 360 of the conveyor station 202 and to an output end 362 of the conveyor station 202. In one embodiment, the sweeper module 130 will include a container 131 that holds debris 203 and then pushes out the debris 203 using a sweeper conveyor 302 disposed near a floor region of the sweeper module 130. In this example, the drop funnel 356 leads to a directional guide 221, which assists in focusing the drop location of debris 203 exiting the output end 362. The directional guide 221 may be made from metal or plastic. In one embodiment, the directional guide 221 may be flexible, e.g., made of rubber to allow movement over and/or partially in a trash can 240 or dumpster. Having the directional guide 221 may reduce spillage of debris.

The sweeper conveyor 302 is configured to rotate the sweeper conveyor module 302 can push and move the debris 203 out of the container 131 via a door 402 (shown below). The debris 203 will therefore drop over a receiving region 350 of the conveyor belt 210. The receiving region 250, in one embodiment, is shown to include a horizontal section of the conveyor belt 210 that then extends along an angle transport region 352 of the conveyor belt 210. The angled transport region 352 continuously extends to a dispense region 354 of the conveyor belt 210. The dispense region 354 includes a horizontal section of the conveyor belt 210 that ends near or at a drop funnel 356 of the conveyor station 202. The drop funnel 356, in one embodiment, is a region of the conveyor station 202 that is shaped to encourage or move debris 203 off the conveyor belt 210 and down toward a receptacle disposed below. The receptacle, in one embodiment, is a trashcan 240 or a dumpster or some type of collection structure.

In one embodiment, the conveyor station 202 has a housing 206, which surrounds or encloses the conveyor belt 210 and its associated frame. The housing 206 may have a connection to a dust cover 204 that is located near the input end 360. By way of example, as debris 203 is pushed out of the sweeper module 130 and over the conveyor belt 210, dust may be generated and the dust cover 204 assist in reducing dust spread at the point where the sweeper module empties its debris onto the conveyor belt 210. In one embodiment, the dust cover 204 is optional. In one embodiment, the dust cover 204 is integrated with the housing 206 and in another embodiment the dust cover 204 is attached to the housing 206 as a separate enclosure or an integrated enclosure.

The conveyor station 202 includes the conveyor belt 210 that is configured to rotate about a plurality of rollers. The rollers assist in forming the shape and angle of the conveyor belt 210. In one configuration, the receiving region 250 may not be horizontal but may have an inclination which may be the same as the angle transport region 352 or different. Similarly, the dispense region 354 may also have an angle that is different than horizontal. Adjusting these angles can be enabled by use of frame structures that placed the rollers at different locations, since the conveyor belt 210 is made of a flexible material. In one embodiment, the conveyor belt 210 is made from a rubber material, or an enforced rubber material, a plastic sheeting material, a compressed form hybrid material, a reinforced steel or fabric reinforcement material, a cloth material, a polyester material, a Kevlar material, a Kevlar enforced material, a rubberized material with Kevlar, a rubberized material with fabric, a rubberized material with steel, etc.

Generally speaking, the conveyor belt 210 is designed to be flexible, and in one embodiment includes a plurality of fins 210a. The fins 210a are designed as extensions or protrusions that assist in holding debris 203 in place or push the debris 203 along the conveyor belt so that the debris can be moved toward the drop funnel 356.

In one embodiment, the conveyor station 202 has a frame that is coupled to a plurality of wheels 230. The wheels 230 enable movement of the conveyor station 202 to a proper place for connection with a docking station 160. In one embodiment, the wheels 230 enable movement of the conveyor station 202 to different locations on a site where the robot module 102 is used and where emptying of debris is necessary. In some embodiments, the conveyor station 202 is weather resistant and can be maintained outside. The weather resistance can be provided by a number of gaskets and seals so that rain, water, dust, and other elements are sealed out of components that require isolation from the weather. In other embodiments, the conveyor station 202 may be installed indoors or in a covered location to isolate from the weather.

In some embodiments, a vacuum can be placed inside the conveyor system 202 to assist in moving debris 203 up along the conveyor belt 210.

Figure 3B:
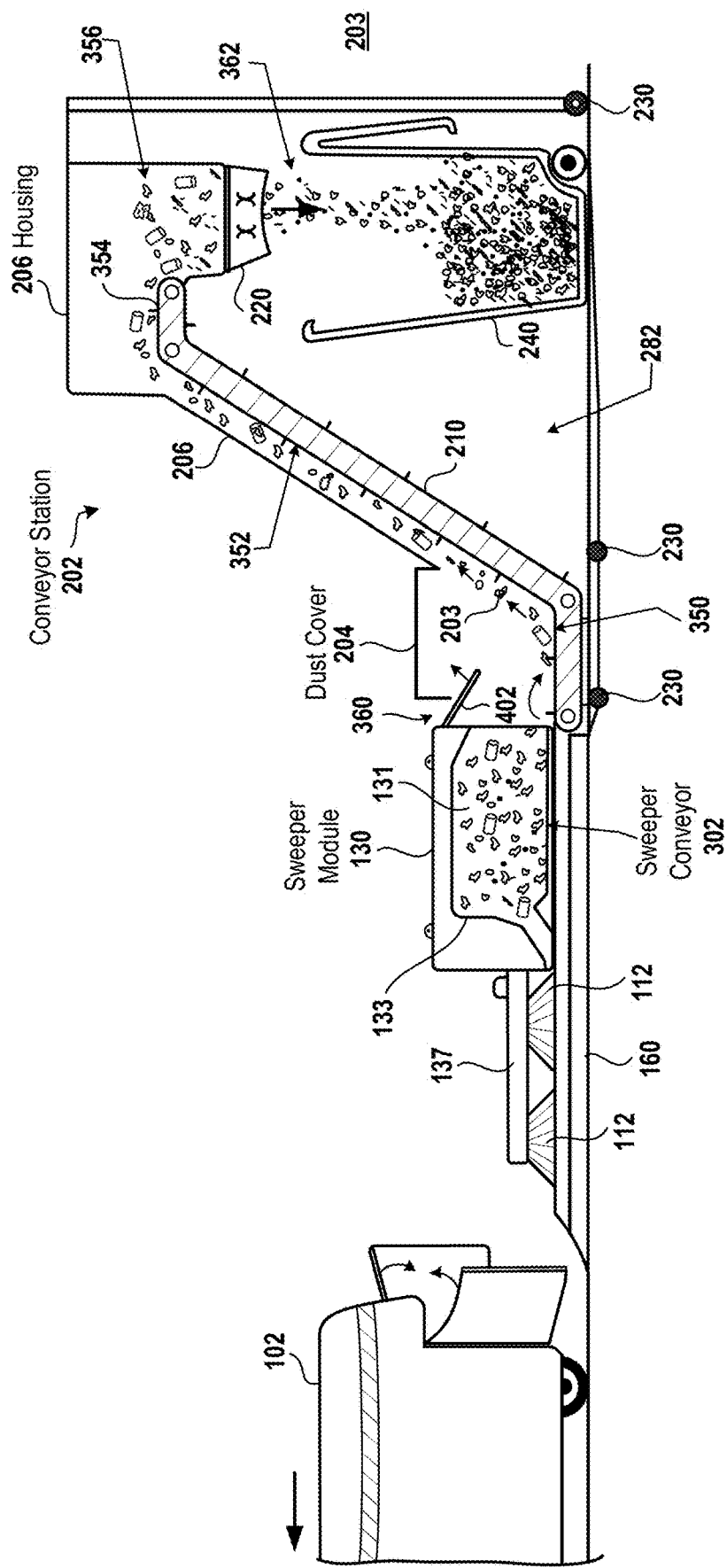
FIG. 3B illustrates an example where the sweeper module is connected to the docking station and is emptying its debris out and onto the conveyor belt, in accordance with one embodiment.

FIG. 3B illustrates an example where the sweeper module 130 is connected to the docking station 160 and is emptying its debris 203 out and onto the conveyor belt 210, in accordance with one embodiment. As shown, the sweeper module 130 includes a door 402 which is opened via a hinge to allow the sweeper conveyor 302 to push debris 203 out and onto the receiving region 350 of the conveyor belt 210. Once the debris 203 is pushed onto the conveyor belt 210, the conveyor belt 210 will then lift and push and move the debris 203 up to a location of the drop funnel 356.

Once the debris 203 has reached the drop funnel 356, the debris is then dropped by gravity over the garbage can 240 that is located under the output end 362. In one embodiment, the sweeper module 130 can include a blower 133, which can assist in pushing out debris 203 out from the container 131 and onto the conveyor belt 210. As shown, the door 402 of the sweeper module 130 is opened over the conveyor belt 210 at the receiving region 350. The input part of the conveyor belt 210 the fines the input end 360 of the conveyor station 202 which extends all the way to the dispense region 354 that leads to the output end 362. Further shown in FIG. 3B, the sweeper module 130 is connected to brushes 112 that extend from the opposite side of the sweeper door 402. In one embodiment, the brushes 112 are coupled to two extension arms 137 that each hold to brushes 112. The extension arms 137 are designed to contract toward each other so that they will fit within the open space of the robot module 102 when the robot module 102 engages with the sweeper module 130. When the sweeper module 130 is inside and connected to the robot module 102, extension arms 137 can be in the form of an open scissors arrangement to provide a wider area path of sweeping than the width of the robot module 102. In some embodiments, the width is dynamically adjustable depending on the surface area and obstacles that may be present.

In one embodiment, the robot module 102 is designed to drop off the sweeper module 130 over the docking station 160, as shown in FIG. 3B. In one configuration, the robot module 102 is designed to communicate instructions to the sweeper module 130 and its associated controller to operate in an emptying operation mode. Once the robot module 102 has instructed the sweeper module 130 to begin emptying its contents, the robot module 102 can disengage from the sweeper module 130 and move away as shown in FIG. 3B. In one embodiment, the robot module 102 can then optionally moved to another sweeper module 130 that is empty and ready to go. In another embodiment, the robot module 102 remains connected to the sweeper module 130 during the emptying operation by the sweeper module 130.

The conveyor station 202 may also include an optional shredder system 220. The shredder system 220 is a module that can be connected to the end of the drop funnel 356. The shredder system 220 can be configured to grind different types of materials which are anticipated to be picked up by the robot module 102 using the sweeper module 130, at a location. In some embodiments, the shredder system 220 is designed to shred organic materials. In some embodiments, the shredder system 220 can be selected to shred harder materials such as cans, aluminum, glass, wood, etc. In other embodiments, the robot module 102 may be designed to pick up paper from an event or a surface that collected paper type debris. In such cases, the shredder system 220 can be designed to shred such softer materials without higher industrial-strength grinder parts or chippers. Accordingly, it is envisioned that the shredder system 220 is an optional component that can be attached or not attached to the end of the drop funnel 356 so that the debris 203 can be output from the output end 362 of the conveyor system 202. In one embodiment, the directional guide 221 of FIG. 3A may be installed or connected under the shredder system 220.

Figure 4A:
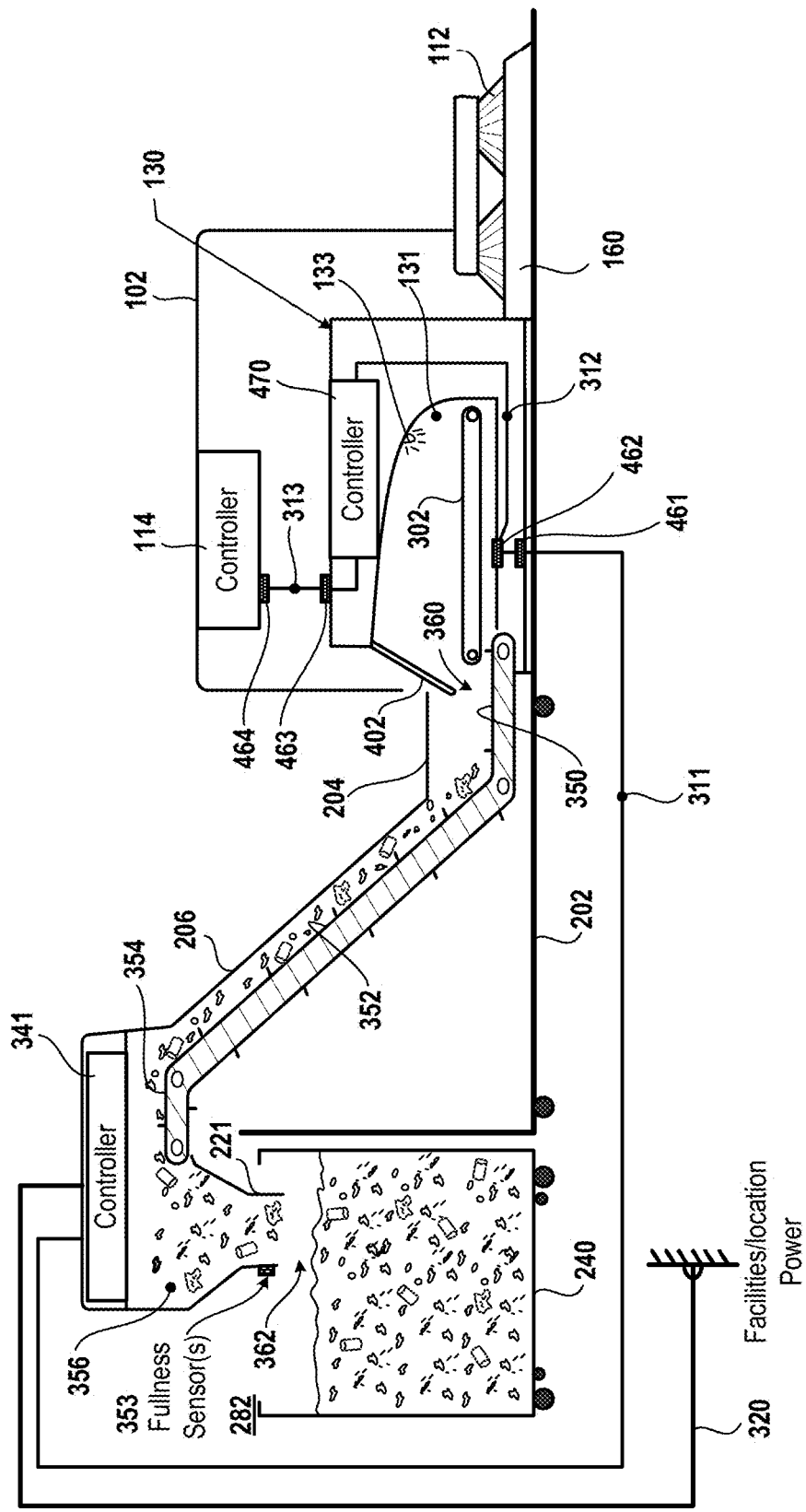
FIGS. 4A and 4B illustrate examples of a conveyor station connected to a docking station, a robot module, and an associated sweeper module, in accordance with one embodiment.

FIG. 4A illustrates an example of a conveyor station 202 connected to a docking station 160, a robot module 102, and an associated sweeper module 130, in accordance with one embodiment. This configuration illustrates the communication between controllers of the various modules. In one configuration, the conveyor station 202 will include a controller 341. Controller 341 includes electronics, software, hardware, firmware, and other systems to enable processing of instructions, control, operation, power, and associated functionality. Broadly speaking, controller 341 can be connected to facilities power via a power connection 320. A power controller can assist in managing the power drawn from the facilities power to power batteries of the sweeper module 130 and the robot module 102. The controller 341 is also configured to communicate with the controller 470 of the sweeper module 130, and the controller 470 is configured to communicate with controller 114 of the robot module 102. In operation, connections are made between the docking station 160 and the conveyor system 202 via connection 311. Connection 311 can provide for communication lines as well as power used to power the battery of the sweeper module 130 and the battery of the robot module 102 using the source power from the facilities provided over line 320.

In one embodiment, a fullness sensor 353 can be provided proximate to the output end 362 to monitor the fullness of the collection can or dumpster 240. In one embodiment, fullness sensor 354 can be an ultrasonic sensor utilized to measure distance between the debris in the receptacle relative to the location of the sensor. In other embodiments, the fullness sensor 353 can be a camera that can capture images that can be analyzed to identify or determine when fullness is approaching. The fullness sensor 353 can operate continuously or at intervals during operation.

Figure 4B:
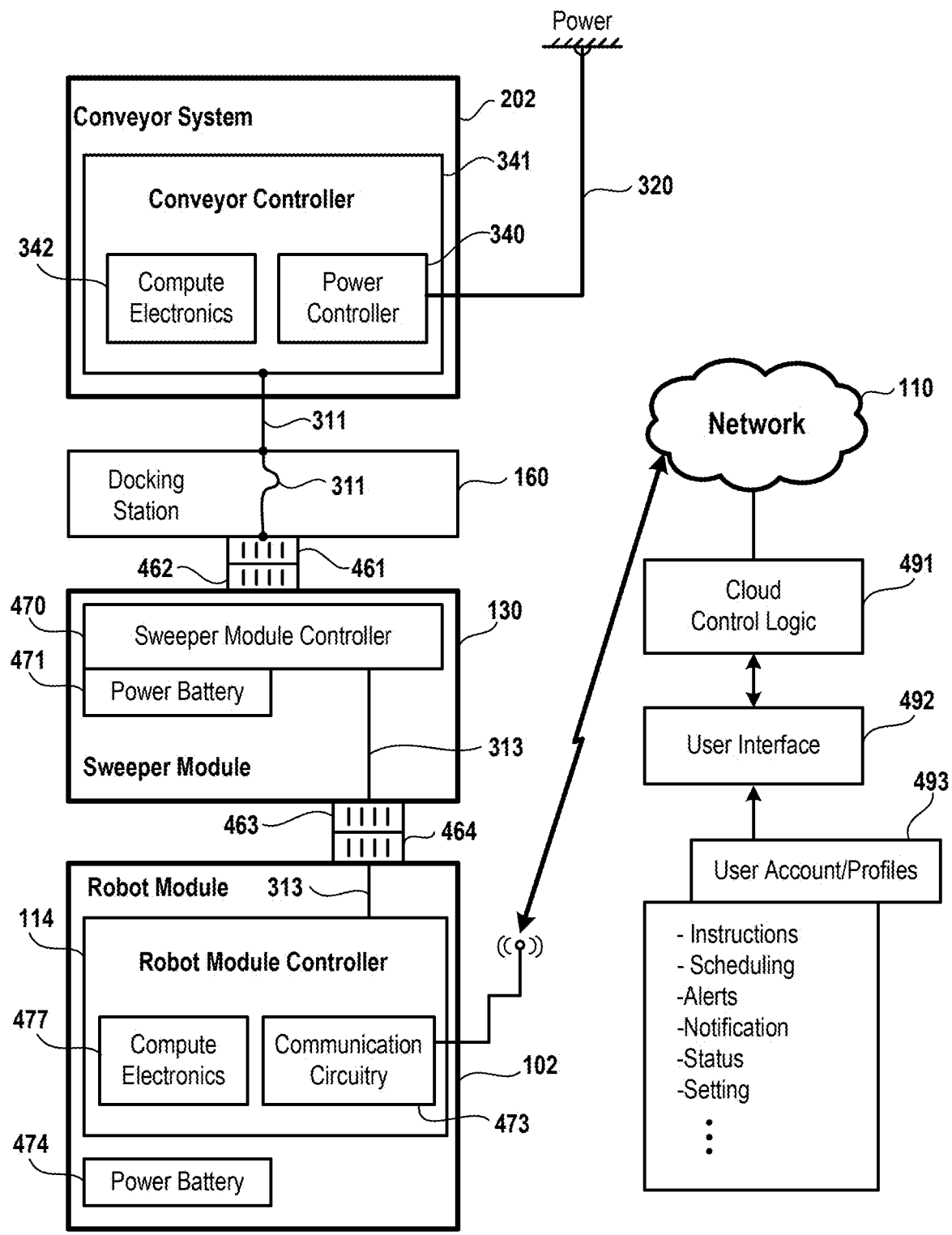

With reference to FIGS. 4A and 4B, connectors 461 and 462 are used to interface and connect the sweeper module 130 to the docking station 160. Similarly, connectors 463 and 464 are used to connect the sweeper module 130 to the robot module 102. In one embodiment, these connectors provide for automatic connection when the robot module 102 connects with the sweeper module 130 and when the robot module 102 places the sweeper module 130 over the docking station 160. In one embodiment, connects 461, 462, 463 and 464 (and other connectors if provided) are designed to enable transfer of power and/or data/communications. Connection 311 is shown between connector 461 and the conveyor controller 341. Connection 311 is defined for cabling of power and data/communication between the docking station 160 and the conveyor controller 341 of the conveyor system 202. In this manner, when a sweeper module 130 is placed in contact and connection with the docking station 160, the conveyor controller 341 will detect the presence of the sweeper module and can communicate with the sweeper module controller 470. Communication is further enabled with the robot module controller 114 that communicates with the sweeper module controller 470 and respectively with the conveyor controller 341.

In FIG. 4B, the conveyor system 202 includes the conveyor controller 341 that can include a number of electronics, cabling, connectors, sensors, microchips, signal processors, general processors, and software running as program instructions for interfacing with the other controllers in the system, and for controlling operation of the conveyor station 202. Broadly speaking, the circuitry and associated electronics is referred to as computer electronics 342, without limitation to the number of discrete circuits, chips, connections, cables, software, etc. A power controller 340 is also provided as part of the conveyor controller or interfaced with the conveyor controller 340. The power controller 340 is designed to receive power from facilities over line 320, and provide that power to batteries of the sweeper module 130 during charging and the robot module 102. The docking station 160, in one embodiment, simply includes the mechanical components for making the connections for connection 311 between the sweeper module 130 and the conveyor controller 341.

As mentioned above, connectors 461 and 462 provide for the mechanical connection between the docking station 160 and the sweeper module 130. Similarly, connectors 463 and 464 provide the mechanical connectors between the sweeper module 130 and the robot module 102, which includes its own robot module controller 114. Robot module controller 114 will also include computer electronics 477, which can be any type of electronic circuitry, processor, computer, connectors, wiring harnesses, chips, circuitry, microcontrollers, etc. Also included as part of or interfaced with the robot module controller 114 is communication circuitry 473. Communication circuitry 473 enables the robot module 102 to communicate wirelessly with a network. The network 110, in one embodiment, can be the Internet's or a local network. In one embodiment, cloud control logic 491 can be executed to provide user interfaces 492. The user interfaces 492 can be provided by a browser or specialized program that is provided with Internet access or network access.

The user interface 492 may enable access via a user account or profile 493. Using the user account or profile of the user, control can be made to robot modules 102, sweeper modules 130, conveyor system 202, and other robots or robot stations associated with the user account. For instance, one user account may enable access to multiple robot modules 102 that may operate a specific location or multiple robot modules 102 that operate in multiple locations. Consistent with the access to control the robot modules 102, the cloud control logic 491 can enable processing of instructions, scheduling, alerts, notifications, status, and customize settings.

It should be understood that the conveyor system 202 may be designed to interface with different sweeper modules 130 that may be utilized to multiple robot modules 102 operating in a specific location. For example, one conveyor system 202 may be utilized by three robot modules and associated sweeper modules 130.

Figure 5A:
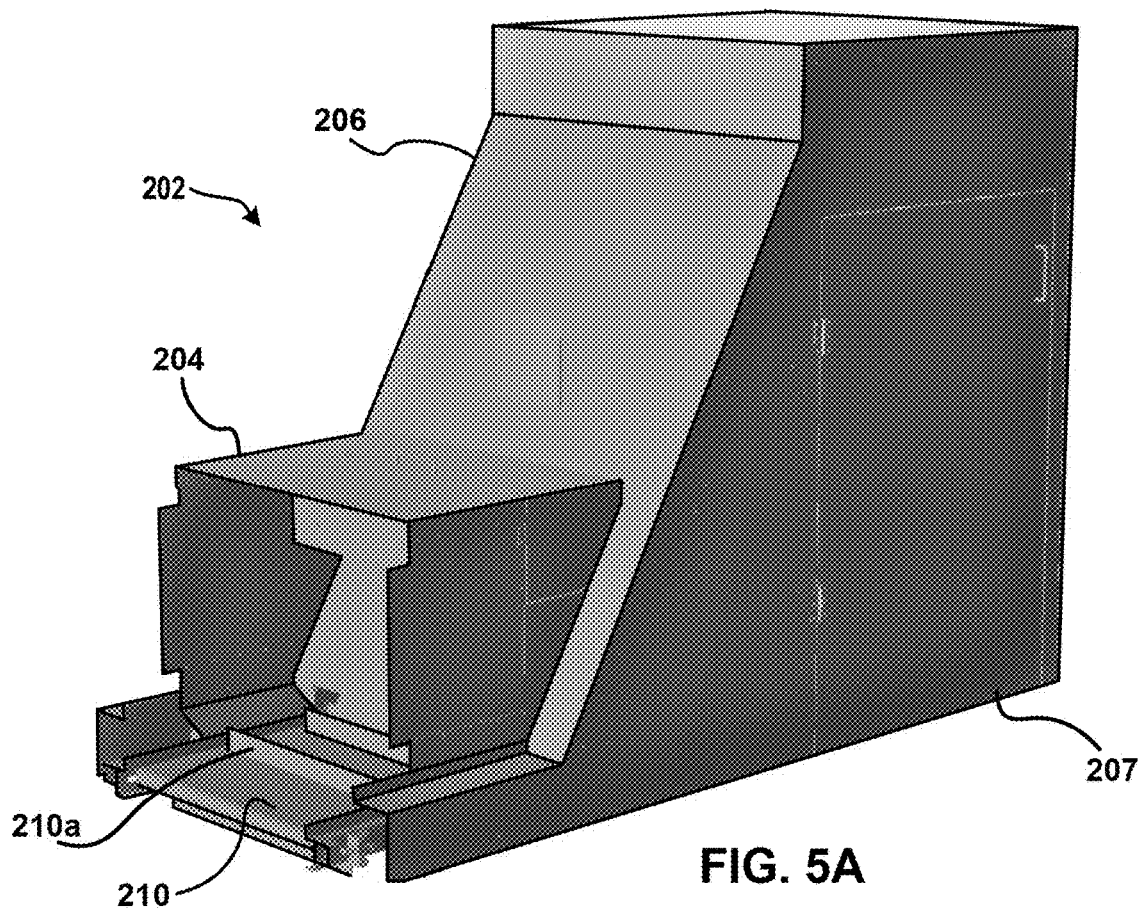
FIG. 5A illustrates a perspective view of the housing of the conveyor system, in accordance with one embodiment.

FIG. 5A illustrates a perspective view of the housing 206 of the conveyor system 202. In this example, the housing 206 is shown connected to the dust cover 204. The dust cover 204 is an additional aluminum enclosure that is connected to a side front of the housing 206. As mentioned above, the dust cover 204 can be integrated as part of the housing 206 or can be omitted for specific implementations or use of the conveyor system 202. In this example, a door 207 is shown on the side of the housing 206. The door 207 allows for placing a container 404 inside so that the debris can be collected once it's dropped out of the output end 362. Once the container 404 is full, the door can be opened to dump the container. In other embodiments, the housing 206 can be open in the area where the container 404 is located. This would allow configurations where a dumpster can be backed up under the output end 362.

Further shown is the conveyor belt 210 and fins 210a that extends out of the surface of the conveyor belt 210. As shown, the fin 210a can extend the width of the conveyor belt 210, and in other embodiments it may only partially extend across the width. In other embodiments, the fin 210a may have different configurations instead of a straight line. In some embodiments, the fin 210a can have a way be line, a zigzag line, a triangular shape, multiple triangular shapes, and different lengths of fins 210. Broadly speaking, the fin 210a disposed along the conveyor belt 210 is designed to push or pull the debris 203 that is place thereupon when the sweeper module 130 is emptied. In some embodiments, fins 210a may have different shapes that may be staggered, may have different heights, may have different width-segments, may have different materials, may have different friction co-efficient, may have different roughness, etc.

Figure 5B:
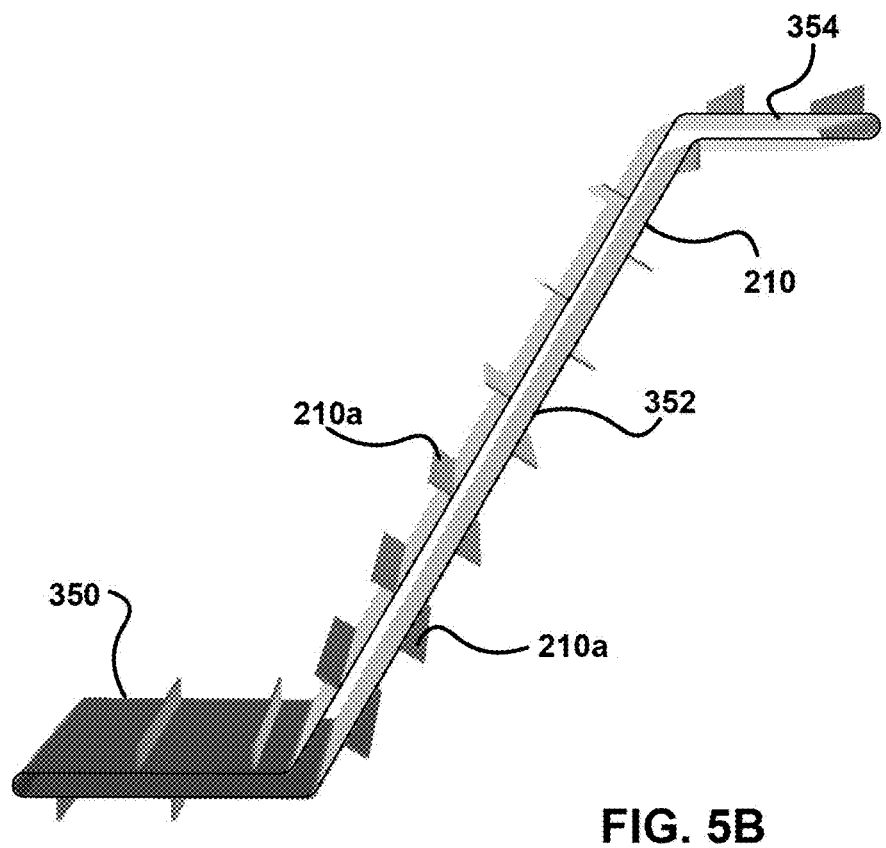
FIG. 5B illustrates an example of the conveyor belt and a number of fins, in accordance with one embodiment.

FIG. 5B illustrates an example of the conveyor belt 210 and a number of fins 210a, in accordance with one embodiment. As mentioned above, the conveyor belt 210 is flexible and can be made to have different angles depending on the placement of rollers located at each end and at each bend. Further, the spacing between the fins 210a can be modified depending on the type of debris being moved. In one configuration, the angle of the angle transport region 352 can vary depending on the type of debris being emptied. In one configuration, the angle can range between 80° and 20°, and in other embodiments can range between 70° and 30°, and in other embodiments can range between 65° and 40°, and in some embodiments can be about 60°. Again, the angle of the angle transport region 352 can be adjusted depending on the type of debris being moved and the speed at which the debris needs to be moved. In some embodiments, the conveyor belt 210 may have different lengths for the receiving region 350 and the dispense region 354. For instance, the receiving region 350 may be longer or shorter before moving to the angled transport region 352. In some embodiments, the dispense region 354 may be longer or shorter before reaching the drop funnel 356. In some embodiments, the conveyor belt may be different surface shapes, e.g., such as lower in the center to define a region where debris are encouraged to toward the center to avoid dropping of debris.

Figure 6A:
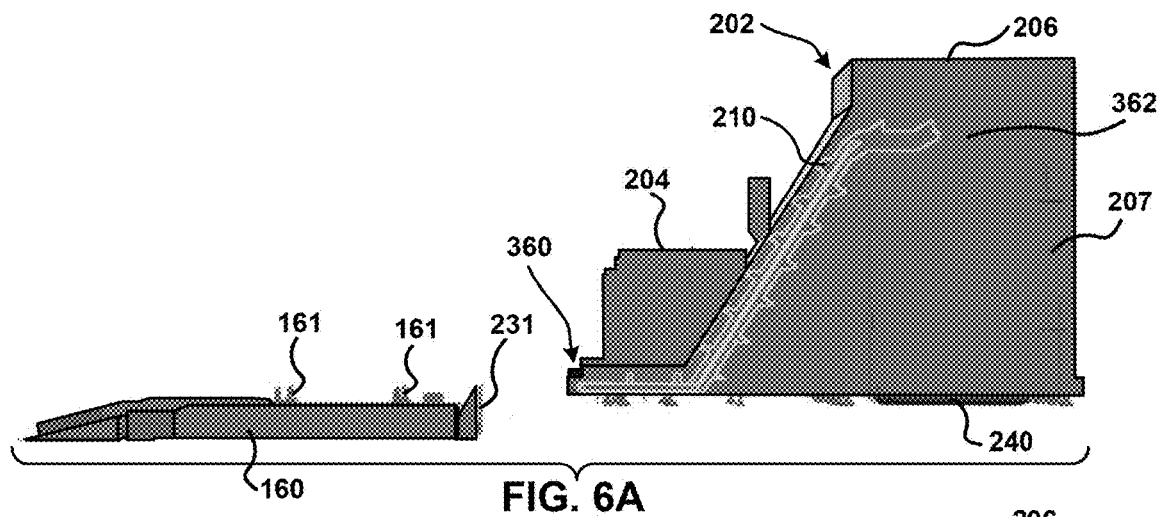
FIGS. 6A-6B illustrates side views of the conveyor system interfaced with the docking station, in accordance with one embodiment.
Figure 6B:
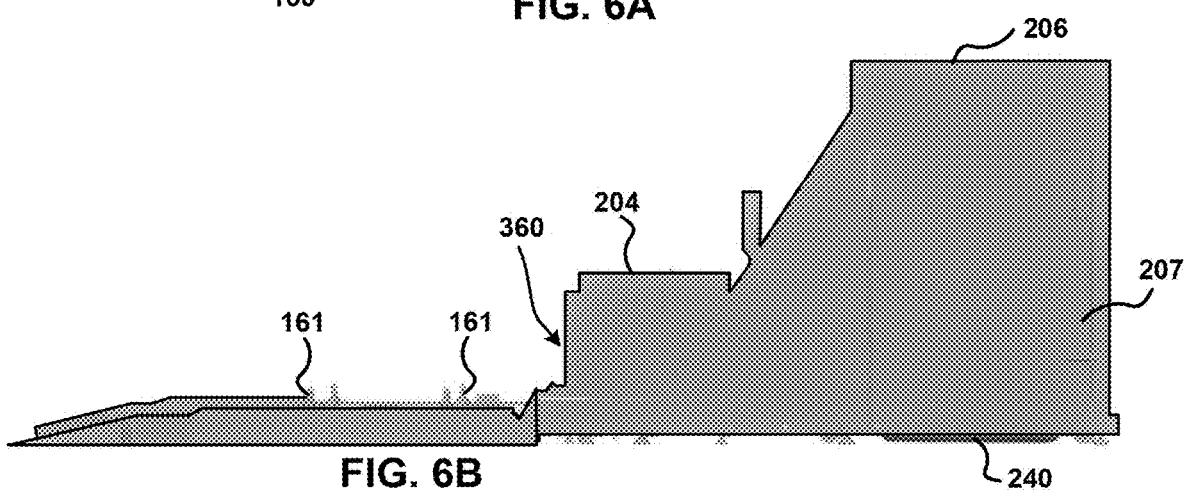

FIGS. 6A-6B illustrates side views of the conveyor system 202 interfaced with the docking station 160. The docking station 160 has a plurality of pins 161 that are used for aligning with the sweeper module 130 when placed over the docking station 160. The docking station 160 is also shown to include a stop 231 that is designed to stop the wheels of the robot module when it rolls over the docking station 164 dropping off or picking up a sweeper module from the docking station 160. When the docking station 160 is connected to conveyor station 202 as shown in FIG. 6B, the dust cover 204 is located proximate to the input end 360. FIG. 6A illustrates a shadow outline of the conveyor belt 210 which extends from the input end 360 to the output end 362.

Figure 6C:
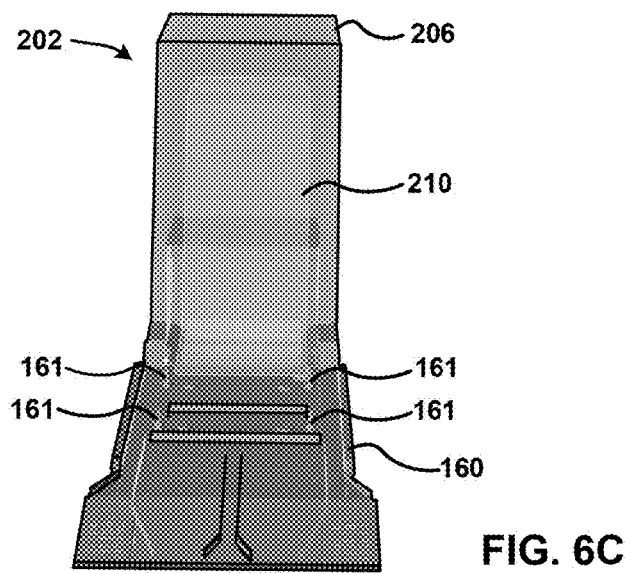
FIG. 6C illustrates a front view of the conveyor system with a shadow view of the conveyor belt showing a top view of the docking station, in accordance with one embodiment.

FIG. 6C illustrates a front view of the conveyor system 202 with a shadow view of the conveyor belt 210 showing a top view of the docking station 160, in accordance with one embodiment. As shown, the docking station 160 has a plurality of tracks that are designed to guide the wheels of the robot module 102 when it is driven over the docking station 160 in a direction of the conveyor system 202. Also shown are the alignment pins 161 over which the sweeper module will be placed and aligned to the conveyor system 202.

Figure 7A:
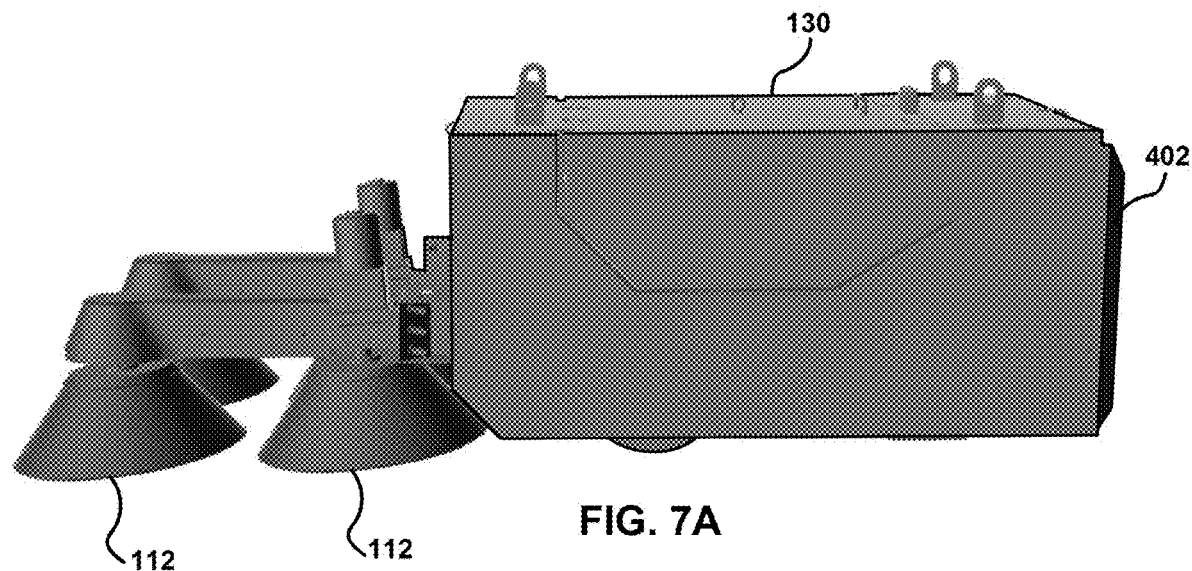
FIGS. 7A-7B illustrates side views and isometric views of the sweeper module, in accordance one embodiment.
Figure 7B:
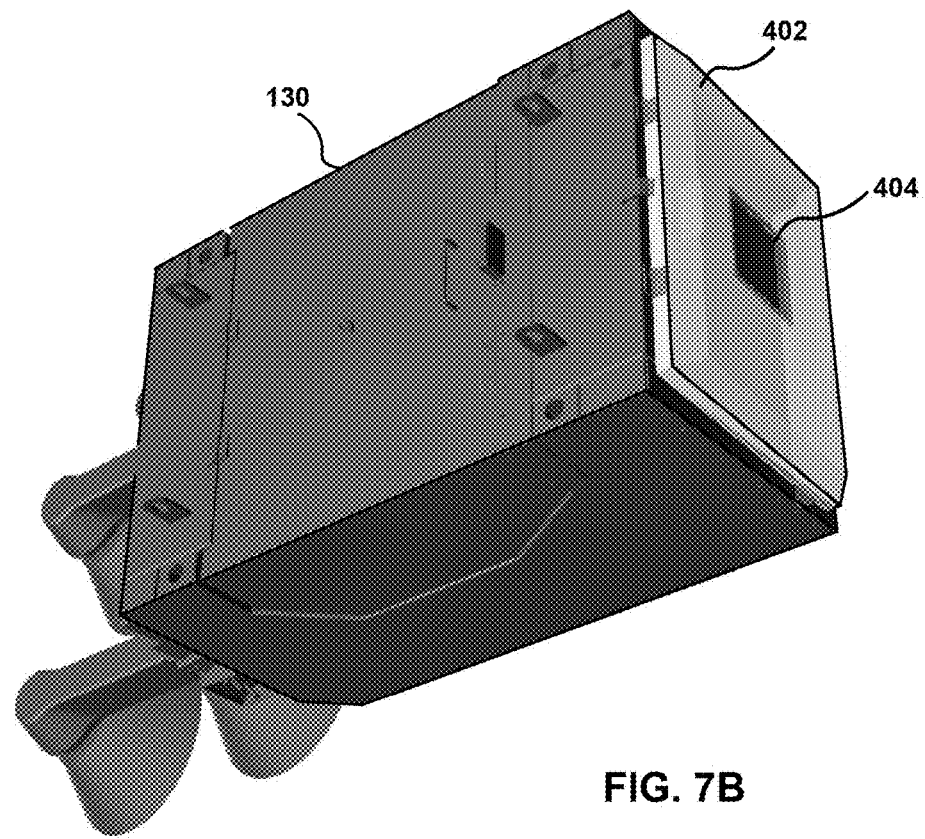

FIGS. 7A-7B illustrates side views and isometric views of the sweeper module 130, in accordance one embodiment. As shown in FIG. 7A, the side-view of the sweeper module 130 shows that the brushes 112 are located opposite the door 402. FIG. 7B illustrates how the door 402 may include a window 404 for viewing inside of the sweeper module 130.

FIGS. 8A-8C illustrates rear views of the robot module 102, in accordance with one embodiment. The robot module 102 will include doors 102a shown in FIG. 8A. In FIG. 8B, the doors 102a are removed to show the door 402 of the sweeper module 130. In FIG. 8C, the door 402 is removed to show a view of inside the sweeper module 130 and the sweeper conveyor belt 302. The sweeper conveyor belt 302 is designed to rotate its surface to enable materials and debris located within the compartment of the sweeper module 130 to be removed and placed onto the conveyor belts of the conveyor system 202. FIG. 8D illustrates a bottom view of the sweeper module 102, which illustrates how the four brushes 112 are oriented when they are close together.

As mentioned above, once the robot module 102 is connected with the sweeper module 130, the brushes can fan-out in a scissors form, where the outer two front brushes 112 rotate outward to provide for a wider coverage of sweeping than the width of the robot module 102. The fan-out position is shown as 112' in FIG. 8D. In some embodiments, the amount of fan-out can be controlled depending on the location where the robot module is sweeping, such as in tighter space constraints. In open areas, the fan-out can be wider to allow for a wider sweeping area and fewer passes.

Figure 9A:
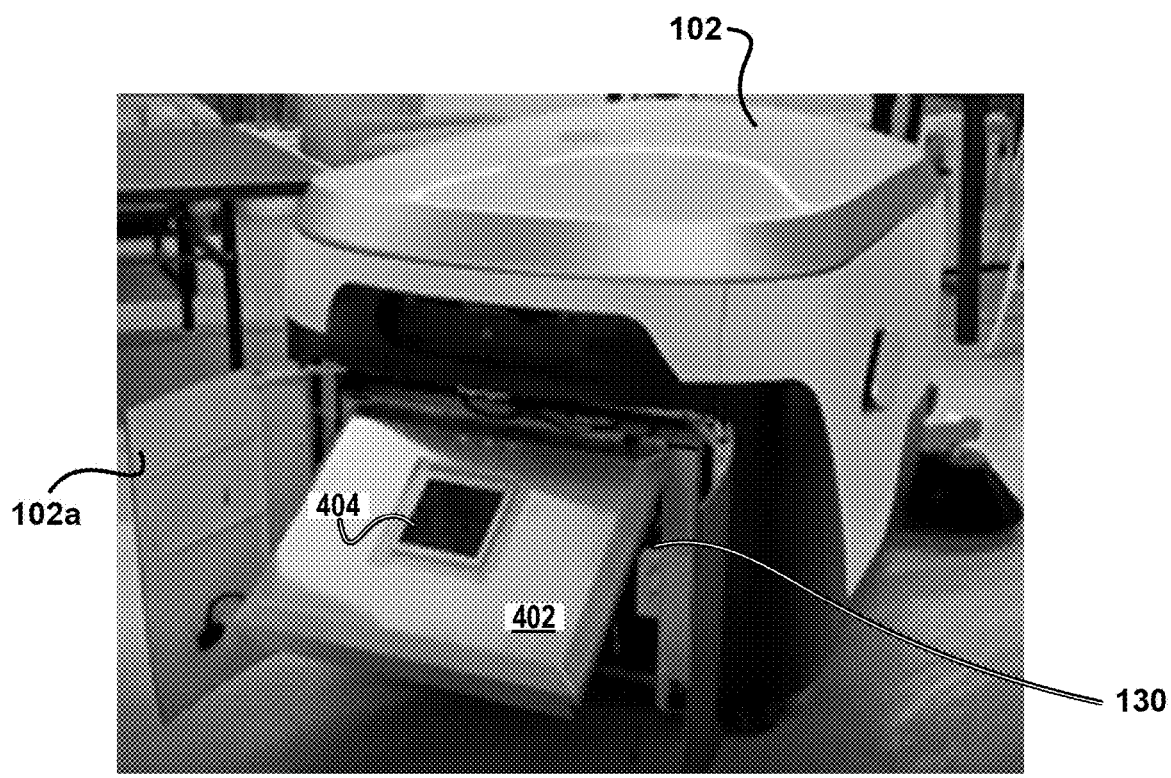
FIG. 9A illustrates a view of the rear side of the robot module while carrying the sweeper module, in accordance with one embodiment.

FIG. 9A illustrates a view of the rear side of the robot module 102 while carrying the sweeper module 130, in accordance with one embodiment. As shown, doors 102a are open as is the door 402 of the sweeper module 130. This illustration shows an optional window 404 in the door 402, to allow viewing into the inside container of the sweeper module 130. For example, it may be desirable to look inside the sweeper module 130 without opening the door 402. Viewing inside the sweeper module 130 may be beneficial if there is a need to determine if an object is stuck or blocking debris inside the container of the sweeper module 130. In some cases, viewing inside may be needed just to confirm that the sweeper conveyor is operational or other service needs.

Figure 9B:
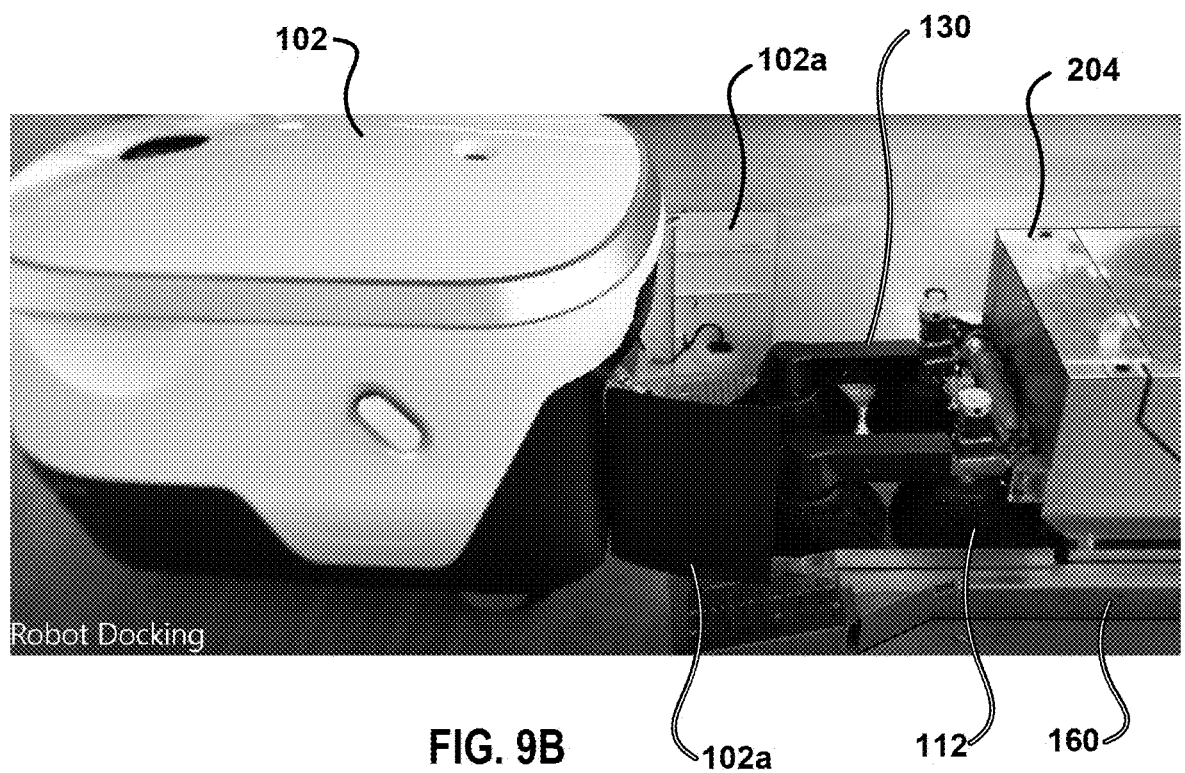
FIG. 9B illustrates a side view of the robot module as it approaches the sweeper module, in accordance with one embodiment.

FIG. 9B illustrates a side view of the robot module 102 as it approaches the sweeper module 130, in accordance with one embodiment. The robot module 102 is designed to move on to the docking station 160, wherein the wheels of the robot module 102 are additionally guided along tracks formed on the surface of the docking station 160. When the robot module 102 has moved over the docking station 160 and rolled along the tracks and is placed completely over the sweeper module 130, the lift mechanism of the robot module 102 can lower to attach to the sweeper module 130. When the lift mechanism of the robot module 102 is lowered onto the sweeper module 130, connectors are automatically engaged between the robot module 102 and the sweeper module 130 to enable communication, as discussed with reference to FIGS. 4A and 4B. Once the robot module 102 has been placed over the sweeper module 130 and connected there with, the lift mechanism can raise the sweeper module 130 off of the docking station 160 and can be removed for use in sweeping surfaces away from the docking station 160.

Figure 10A:
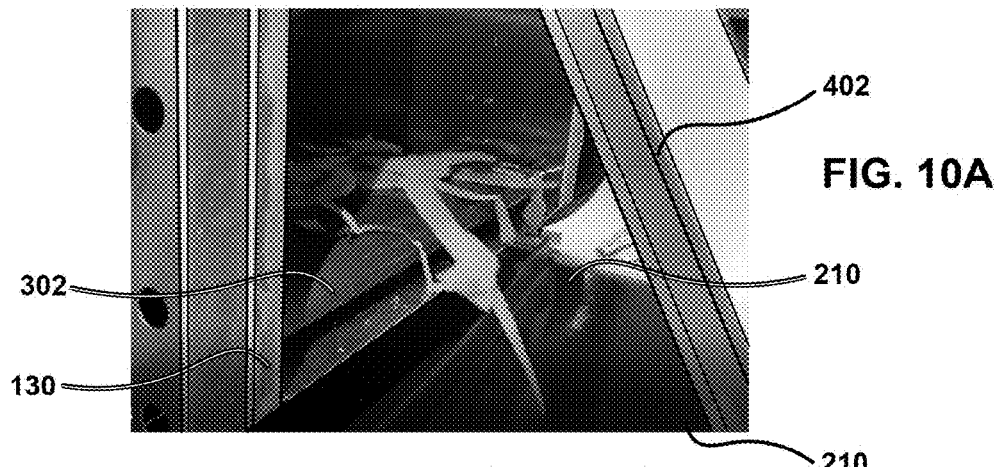
FIGS. 10A-10D illustrate examples of emptying of the sweeper module onto the conveyor belt of the conveyor station, in accordance with one embodiment.
Figure 10B:
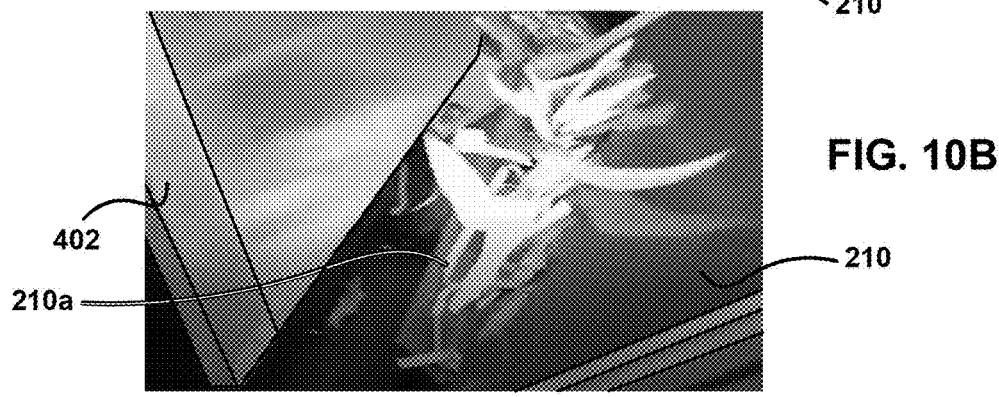
Figure 10C:
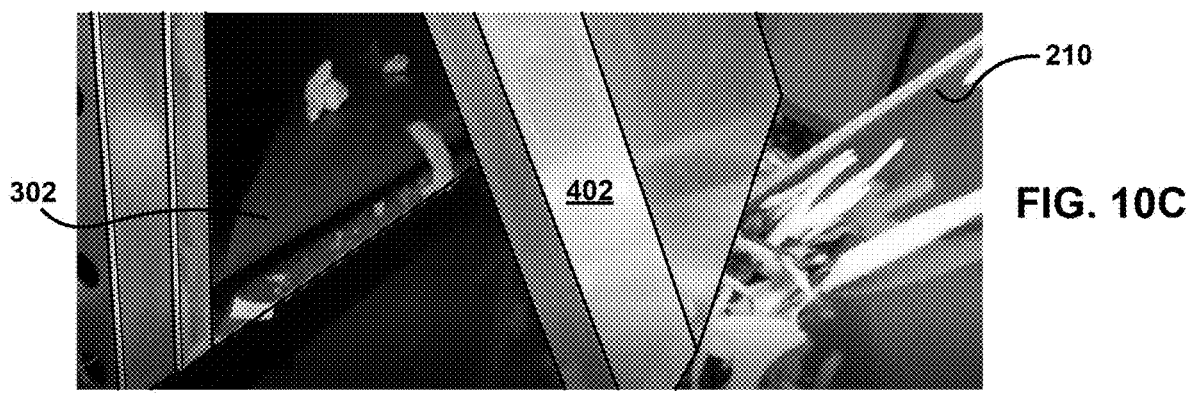

FIGS. 10A-10D illustrate examples of emptying of the sweeper module 130 onto the conveyor belt 210 of the conveyor station 202, in accordance with one embodiment. In FIG. 10A it is shown how the sweeper conveyor 302 is rotated so as to force or push debris out of the sweeper module container and onto the surface of the conveyor belt 210. This illustration shows how garbage particles of different sizes, e.g., debris, are pushed out of the sweeper module 130 and onto the conveyor belt 210. FIG. 10B illustrates how fins of the conveyor belt 210 are used as stoppers that can lift debris up the incline of the conveyor belt so that the debris can be emptied out of the output end 362 and into a container or garbage can. FIG. 10C provides a more detailed view of the sweeper conveyor belt 302 as it empties debris onto the conveyor 210. This also illustrates how the door 402 is opened sufficiently to allow the debris to exit out of the sweeper conveyor belt 302 and onto the conveyor belt 210.

Figure 10D:
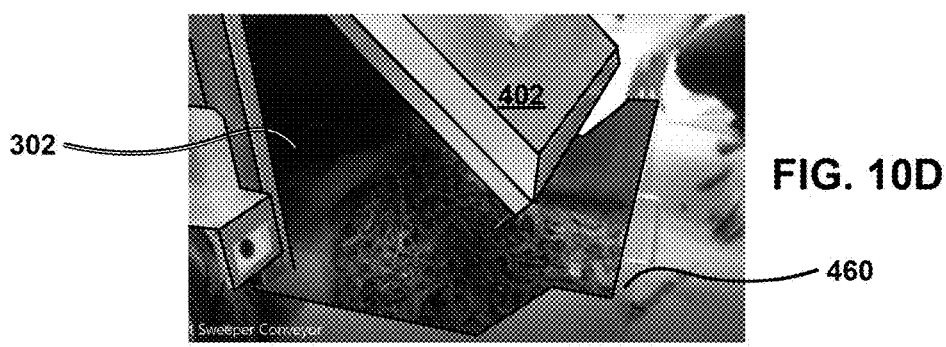

FIG. 10D illustrates an alternative embodiment where instead of having a conveyor belt 210, a handheld scoop or container 460 can be placed to receive debris being pushed out by the sweeper conveyor belt 302. In some embodiments, the robot module 102 may not be suitably near the conveyor station 202, and manual removal of debris may be necessary. Nevertheless, it is possible for the conveyor belts of the sweeper 302 to still function and push debris out onto a manual tray or catching container. These materials can then be manually emptied out into a normal garbage can or dumpster. In one embodiment, the robot module 102 is programmable and set to operate in a mode for manual emptying or alternatively to interface with the conveyor station 202 for automated emptying as described above.

Figure 10E:
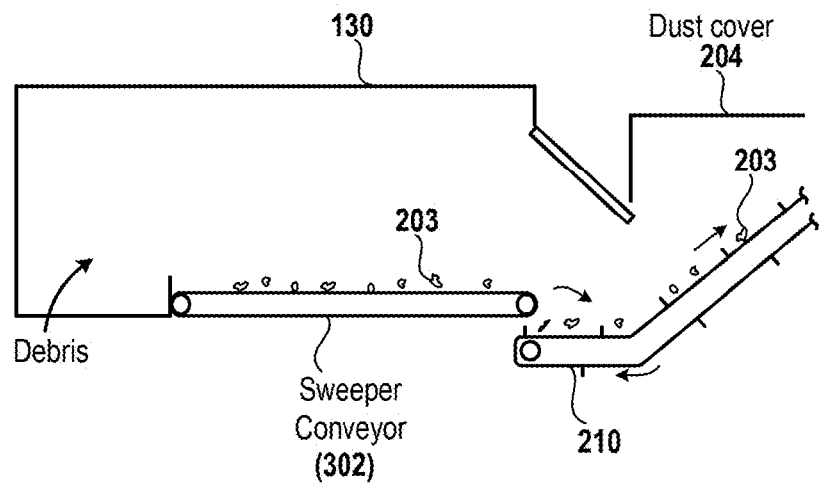
FIG. 10E illustrates an example where the sweeper conveyor is shown in a horizontal configuration at the base of the sweeper module, in accordance with one embodiment.

FIG. 10E illustrates an example where the sweeper conveyor 302 is shown in a horizontal configuration at the base of the sweeper module 130. As shown, debris 203 is moved off of the sweeper conveyor 302 and onto the conveyor belt 210 as described above. A dust cover 204 is optional, and maybe assist in maintaining a lower disbursement of dust robot module and sweeper robot have collected material that produces excess dust, or the location where emptying of the sweeper module requires low admission of dust.

Figure 10F:
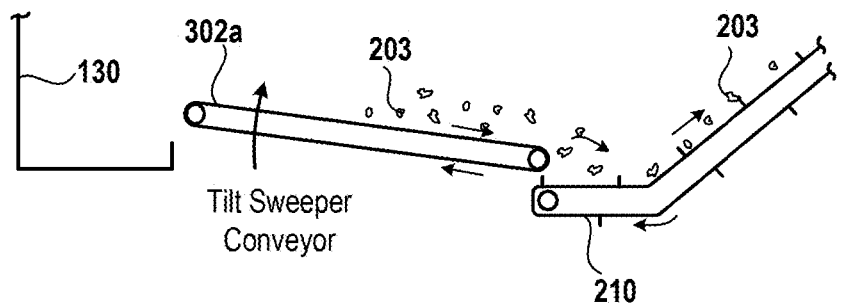
FIG. 10F illustrates an example where the sweeper conveyor belt operates as a tilt sweeper conveyor, in accordance with one embodiment.

FIG. 10F illustrates an example where the sweeper conveyor belt 302 operates as a tilt sweeper conveyor 302a, in accordance with one embodiment. For example, if it's difficult to empty the inside of the sweeper module 130 depending on the type of material being collected or the fullness level, it is possible to tilt the sweeper conveyor 302 the function as a tilt sweeper conveyor 302a. In one embodiment, the tilting can occur to place the conveyor at a tilt or can place the conveyor at a tilt at intervals or in motions to provide the continuous up and down operation to encourage or push debris out. In other embodiments, the conveyor is simply placed at a tilt and left there for emptying of debris 203.

Figure 10G:
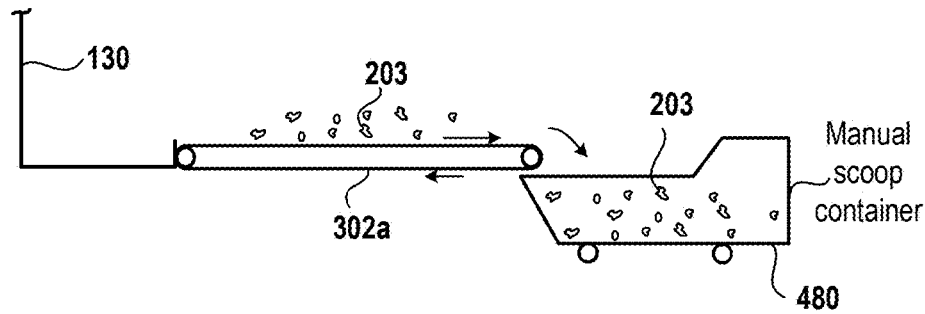
FIG. 10G illustrates an example where a manual scoop container is used to collect debris being emptied from the sweeper module, in accordance with one embodiment.
Figure 10H:
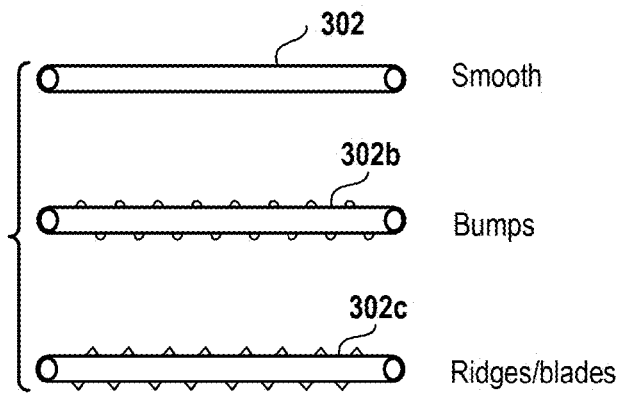
FIG. 10H illustrates an example where different types of conveyor surfaces may be provided, in accordance with one embodiment.

FIG. 10G illustrates an example where a manual scoop container 480 is used to collect debris 203 being emptied from the sweeper module 130, as described above. FIG. 10H illustrates an example where different types of conveyor surfaces may be provided. For example, the conveyor material may be a smooth conveyor 302, or a conveyor 302b with bumps or teeth, or a conveyor 302c with ridges or blades, or a conveyor having different geometric shapes, protrusions, geometric scoops, or shapes that will assist in pushing or encouraging debris from being emptied out of the sweeper module 130 when the conveyor is rotated the force debris onto the conveyor belt 210 or a manual scoop 480.

In some embodiments, the robot module 102 can be configured to directly output debris onto the conveyor belt 210 without the need to move on to the docking station 160. For example, in such configurations, the robot module 102 can move onto a platform that is elevated slightly so that the sweeper conveyor 302 can be slightly above the conveyor belt 210, to allow direct output of debris from the sweeper module 130 onto the conveyor belt 210. In other embodiments, the conveyor station 202 can be designed such that section 350 can be lowered below ground level so that the robot module 102 can directly backup over the conveyor belt 210 and the deliver debris without needing to move onto the docking station 160. In other embodiments, the robot module 102 can be configured with a lift that raises the robot module 102 and the sweeper module 130 together to an elevated position after it reaches a location where it is adjacent to the conveyor belt 210. Once in the elevated position, the robot module 102 can back up slightly so that the sweeper conveyor 302 can push debris directly over the top surface of the conveyor belt 210. In any of these configurations, it is possible for the robot module 102 to move into position proximate to the conveyor belt 210 and drop off debris without connecting to a dock station 160.

In some embodiments, the conveyor station 202 is designed to have an assigned geolocation, a QR code, or some other identify location that the robot module 102 can identify for finding a location to connect with the docking station 160 or interfaced with the conveyor station 202 without a docking station 160. In some embodiments, the robot can simply use its cameras to see and locate the conveyor station 202 and then approach it using GPS and/or other tracking mechanisms so that the robot module can interface with the conveyor station 202. In other embodiments, the conveyor station 202 can be equipped with automation so that it can move on its wheels to different locations and position itself adjacent to trash cans or dumpsters. For example, if one dumpster or trashcan becomes full, the conveyor station 202 can simply move or slide to a different location to be directly over an empty trashcan or dumpster. In some embodiments, the conveyor station 202 can be connected to a wired link to power, or can itself have batteries that are charged either off of the power grid or using solar power. Therefore, it is believed that the conveyor station 202 can provide more autonomous features that can interface with and complement of the autonomous nature of the robot module 102.

In one embodiment, the sweeper module 130 can be operated to empty the trash or debris in a cleaner mode, while preventing excess dust. For example, it is possible to run a vacuum system that is part of the sweeper module 130 at a negative pressure. For example, while the back door 402 of the sweeper module 130 is open and emptying using the conveyor 302 of the sweeper module, it is possible to run the vacuum at a reduced vacuum level to create a slight negative pressure inside of the container of the sweeper module. For example, during normal operation of sweeping, the sweeper module 130 may be operating at a level 9 or 10, where level 1 is low vacuum force and level 10 is high vacuum force. However, when the door 402 is open and the conveyor is pushing debris out, it is not recommended to operate at a level 10. Instead, a lower operating level that is approximately less than 5 or less than 2 is activated. This creates a negative pressure inside the chamber of the sweeper module 130, which in turn prevents dust from spraying or dispersing when the sweeper conveyor 302 is still able to push debris out onto the conveyor belt 210 or onto a manual scoop. Generally, a negative pressure is created when the pressure inside the chamber of the sweeper module 130 is less than the pressure outside of the sweeper module 130. In one embodiment, by creating this negative pressure inside the sweeper module 130, it is possible to omit having a dust cover 204 as part of the conveyor station 202.

The robot module 102 may include one or more antennas, and can include cameras integrated into the body regions. In some embodiments, the cameras may be integrated to the sides of the outer body of the robot module to enable a 360 degree view. In one configuration, the top portion of the body may open to expose or grant access to electronics associated with the controller 114, electronics for interfacing with batteries of the sweeper module in the robot module 102, and other devices. Some electronics related devices may include processors, microcontrollers, system-on-a-chip processors, application specific integrated circuits (ASICs), memory modules, hard drives, solid state drives, network interface cards, radio communication devices, cellular transceivers, associated operating systems, controller boards, lights, plugs, circuit boards, connection wiring, and associated assemblies.

Other devices, without limitation, may include (without limitation) control systems for cameras, depth cameras, radar, LIDAR, motion sensors, depth sensors, ultrasonic sensors, heat sensors, motion sensors, strain sensors, motor sensors, locking sensors, lifting sensors, docking sensors, and other operational or interfacing sensors. In some embodiments, the wheel configuration can be interchanged, depending on the surface the robot is designed autonomously move about. For example, some wheels may be off-road if the vehicle is used on dirt roads or on farms, or harder surface wheels used in parking lots or smooth surface. In other embodiments, instead of wheels, loop rubber tracks can be used for more off-road operation.

Though in implementations of the disclosure described above, a robot module 102 has been discussed, it will be appreciated that in other implementations, other types of exchangeable modules having different functions can be attached to the robot. For example, a lift mechanism of the robot can be used to attach and retain interchangeable modules/attachments for performing different work functions. The exchangeable modules are physical apparatus structures that may each be configured to perform a unique task, e.g., steam cleaning, vacuuming, grass cutting, polishing, buffing, driveway and/or street cleaning (e.g., sweeping), package grasping and/or moving, etc. In some embodiments, the interchangeable attachments may be configured to perform complementary tasks. For example, for cleaning a floor, the first interchangeable attachment may be configured to vacuum the floor and the second interchangeable attachment may be configured to steam clean the floor.

In some implementations, the interchangeable attachments may be automatically loaded and unloaded from the robot one or more dock assemblies (or docking stations or base stations). The loading and unloading may be performed autonomously, with the robot automatically aligning itself and loading or unloading an interchangeable attachment as needed to accomplish the job assignment that the robot has been programmed to perform.

In some embodiments, the vertical movement of attachments achieved via a lift mechanism of the robot may be utilized as part of performing a task and/or to accommodate interchangeable attachments of different sizes. For example, in the case of a sweeper module the lift mechanism can be utilized to lift the sweeper module to a height required to remove the sweeper module from the dock assembly. The lift mechanism can also be used to lower the sweeper module to the appropriate height for carrying out sweeper operations, such as a height at which the brushes of the sweeper module fully contact the floor.

In some implementations, the robot includes a controller that is configured to control the autonomous functions of the robot. For example, the controller can control the motors which effect movement of the wheels of the robot to move the robot in its operations, such as to control movement of the robot over the sweeper module, and move autonomously along a path to capture debris into the container of the sweeper module. Further, the controller can control the robot's lift mechanism to lower the lift frame over the sweeper module to connect the alignment pegs with the alignment holes, control the locking mechanism to secure the lift frame to the sweeper module, and control the lift mechanism to raise the lift frame along with the sweeper module toward the interior space of the robot. It will be appreciated that the controller may control these operations in reverse so as to lower the lift frame along with the sweeper module, to seat the sweeper module onto the alignment platform, unlock the sweeper module so as to release the sweeper module, control the lift mechanism to raise the lift frame without the sweeper module, and move the robot off of the dock assembly while leaving the sweeper module at the dock assembly, for example, to allow the sweeper module to charge its battery or be serviced otherwise.

It will be appreciated that in some implementations, the robot includes a battery for powering its motors, lift mechanism, sensory systems, and other electronic systems. The sweeper module can also include a battery for powering the sweeper module, such as powering rotation of its brushes. In some implementations, a battery controller handles sharing of power between the robot's battery and the sweeper module's battery. The battery controller can be implemented as part of the robot or the sweeper module, or partially implemented on both the robot and the sweeper. In some implementations, power from the sweeper module's battery can be shared to the robot to, for example, charge the robot's battery, power the robot's motors, lift mechanism, locking mechanism, sensors, communications, etc. Likewise, in some implementations, power from the robot's battery can be shared to the sweeper module to, for example, charge the sweeper module's battery, power the sweeper module's brushes, etc.

In some implementations, the battery of the sweeper module is significantly larger than the battery of the robot, as the sweeper module is retained at the docking station and subject to charging for greater periods of time. Hence, the battery of the sweeper module can be implemented as the primary power source for the sweeper module as well as the robot, and therefore used to power the functions of both units.

In some implementations, when the sweeper module is connected to a docking station, and the robot is connected to the sweeper module, then the battery controller can route power to effects charging of one or both of the sweeper module's battery and the robot's battery. It will be appreciated that the battery controller routes power received from the docking station through the sweeper module to the robot, in order to provide power to the robot to charge its battery.

In some implementations, the robot includes a plurality of cameras and a global positioning system (GPS) for controlling movement of the robot by the controller. In some implementations, the robot uses one or more cameras to align with a visible code located at the dock system as described above, and images of the visible code are processed by the controller for guiding the robot to align with the dock system when the robot approaches the dock system for pickup or release of the sweeper module.

Advantageously, robots according to various embodiments disclosed herein may run indefinitely, with the robot constantly swapping batteries and interchangeable attachments as the need arises and as job assignments change. As a result, the robot may function as a home cleaning robot, a commercial cleaning robot, an outdoor robot, an indoor robot, etc. which may autonomously change its abilities without the need of human interaction (e.g., from grass cutting with a grass cutting attachment, to moving bins and crates of an adapter for supporting bins and crates, to cleaning driveways with a vacuum and/or sweeping attachment). An example of the operation of the robot is provided below. It will be appreciated that the sequence below may be performed in the order shown. In addition, omissions of certain actions and/or changes in the order of various actions are also contemplated.

The robot may start off at a charging base station with an interchangeable attachment (e.g., a sweeper module) locked to the main chassis or body of the robot through its retention system. The robot may start off with a power supply (e.g., a removable battery) already in place. The robot heads out of the charging base to perform its assignment (in this case sweeping). When the robot is finished with the assignment (finished sweeping a given area), or when the interchangeable attachment is filled to capacity (e.g., when a sweeper module is filled with debris) the robot will return to the base station or another designated drop area, and detach the interchangeable attachment. The detachment may occur via unlock and pushout of the attachment, or by dropping the attachment under the force of gravity. The robot aligns itself to the interchangeable attachment, or wherever the retention adapters are among the interchangeable attachments, moves towards the interchangeable attachment, centers itself (e.g., using sensors such as a camera) and the retention system locks/unlocks the interchangeable attachment as desired. When the robot approaches the base/charging station, at a certain distance it starts a docking procedure.

The robot maintains a docking distance from the base station to help itself align to the back of the modular box as well as to the retention system before the robot docks. This docking procedure exists in both retaining and detaching the interchangeable attachments at a designated area or a base/charging station. The base station may help guide the robot via sensors and buttons to dock at the base station and aligned with the retention system. In other words, the base station may provide guidance for the robot to return to the station. In addition, the station may include an actuator that shifts the position of the interchangeable attachment to align with the retention system of the robot. The robot may move towards and locate the base station with a variety of sensors, such as live feed cameras, infrared or other proximity sensors, ground sensors, or line detection sensors that are able to follow "tracks" which may be provided on the ground along the path which the robot is to traverse. The tracks may be, e.g., anything from tape that is sensed by the robot, paint sensors disposed or integrated into a surface, or sensors embedded at specific locations in the ground. The use of tracks in one embodiment is optional, since the robot will be able to use its cameras and sensors to navigate and avoid obstacles. The robot may use a variety of sensors such as live feed cameras and/or infrared or other proximity sensors to help locate, and load and unload the interchangeable attachments at a base station or other designated area.

The robot may move to an empty location (e.g., at the base station or at a designated area) and detach its interchangeable attachment. Preferably, this detachment occurs at the location the interchangeable attachment was originally picked up from, e.g., at the space left open when the component was earlier retained by the robot. The robot may then move to another interchangeable attachment for another task. For example, the robot may align itself with a steam cleaning interchangeable attachment located at the base station (e.g., next to or around the vacuum interchangeable attachment), and pick up the steam cleaning interchangeable attachment via the retention system, and then move away from base station to perform the steam cleaning task. In some other embodiments, both the vacuum attachment and the steam cleaning attachment may be loaded onto the robot such that vacuuming and steam cleaning maybe performed without requiring the robot to return to the base station to switch attachments.

The robot can navigate with the help of GPS, in addition to other location devices not positioned on the robot itself or the base station to help with returning to an interchangeable attachment for docking and undocking. These location devices may include Bluetooth beacons or infrared light emitters. In cases where the robot is equipped with a modular, removable power supply, the power supply may be unloaded and a new power supply may be loaded in a procedure similar to the unloading and loading of interchangeable attachments. For example, where the robot has performed various tasks and its attached battery is running low, the robot may: move to a base station containing a charged or charging battery, unload a depleted battery at the base station or designated area, and load another battery.

In cases where the robot is not equipped with a modular, removable power supply, the robot may use a variety of sensors to return to the base station for recharging. The robot may return to the base station to recharge, head off to finish its job, or remain at the base station depending on whether a job assignment has been completed. The robot may be charged while retaining an interchangeable attachment. For example, such charging may be performed via connectors built into the robot that send signals and power to both the interchangeable attachments and the robot's main computer system. In some embodiments, charging may occur without the robot retaining any interchangeable attachment.

It will be appreciated that the interchangeable attachment may be tracked by the robot using shape/color or design. Such tracking may be utilized to align to the robot for unloading and loading the interchangeable attachment.

It will be appreciated by those skilled in the art that various omissions, additions and modifications can be made to the processes and structures described above without departing from the scope of the invention. For example, it will be appreciated that the robot has been shown without any side panels or other housing around the functional illustrated components. In some embodiments, a housing or shell may be provided around the illustrated components e.g., to protect these functional components from collisions of external objects, weather, or other external phenomena that may damage these functional components.

In addition, the housing may maintain a consistent external appearance and size/shape to the robot, irrespective of the sizes of the interchangeable attachments or the number of retained attachments. This may provide aesthetic benefits and/or allow a consistent interface with other devices external to the robot (e.g., a base station) irrespective of modifications to the internal components or interchangeable attachments. In addition, while various components have been illustrated and discussed as being placed at different locations, it will be appreciated that the relative locations of the various compliments may be varied while still maintaining the functionality disclosed herein.

It is contemplated also that various combinations or sub-combinations of the specific features and aspects of the embodiments may be made and still fall within the scope of the description. Various features and aspects of the disclosed embodiments can be combined with, or substituted for, one another in order.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A conveyor station, comprising,
a housing having an input end and an output end;
a conveyor belt having a receiving region proximate to the input end and an angled transport region leading toward a dispense region, the conveyor belt having a plurality of fins that extend out from a surface of the conveyor belt, the plurality of fins enable movement of debris collected at the receiving region toward the dispense region, wherein the dispense region is configured to push debris into a drop funnel of the housing, the drop funnel directs debris into a receptacle; and
a conveyor controller of the conveyor station is configured with a sensor for detecting presence of a sweeper, the sweeper includes a container that holds debris collected when the sweeper is connected to a robot;
wherein debris are configured to be emptied from said sweeper directly onto said receiving region of the conveyor belt;
wherein the housing includes wheels for movement of the housing to a location of operation;
wherein the sweeper includes a sweeper conveyor disposed at a base of the sweeper, the sweeper includes a sweeper door that is configured to open to enable the sweeper conveyor to move debris from the container inside the sweeper directly over the receiving region of the conveyor belt of the conveyor station, wherein a system is defined when said sweeper is interfaced with the conveyor station;
wherein the conveyor controller is configured to activate rollers of the conveyor belt in response to exchanging control data with a sweeper controller, such that the sweeper controller is configured to move the sweeper conveyor when the conveyor belt of the conveyor station is moving, such that debris in the container are moved out of the container and onto the receiving region of the conveyor belt.

2. The conveyor station of claim 1, further comprising,
a shredder system connected between the drop funnel and the output end, such that debris received off the dispense region of the conveyor belt flow into the drop funnel and are shredded before exiting said output end that is disposed over the receptacle.

3. The conveyor station of claim 1, further comprising,
a dust cover of the housing, the dust cover is disposed over the receiving region of the conveyor belt, wherein said dust cover defines an enclosure surrounding a portion of said receiving region of the conveyor belt.

4. The conveyor station of claim 1, wherein the conveyor controller is interfaced with a power controller, the power controller is configured to provide power to said sweeper when the sensor detects said presence of the sweeper, wherein said sweeper includes a sweeper controller that communicates with both said conveyor controller and a robot controller of said robot.

5. The conveyor station of claim 1, further comprising, a docking station, the docking station is configured to connect with the housing, and said sweeper is configured to connect to the docking station when the sweeper is placed over the docking station by the robot.

6. The conveyor station of claim 5, wherein when the sweeper is connected to the docking station, a sweeper controller is interfaced with a conveyor controller and power is provided to the sweeper by a power controller of the conveyor station.

7. The conveyor station of claim 1, further comprising,
a docking station connected to the housing, the docking station including a track for guiding wheels of the robot onto the docking station for dropping off the sweeper for emptying or collecting the sweeper for continuation a next sweeping operation.

8. The conveyor station of claim 1, wherein the housing has a lower region proximate to the input end and an elevated region proximate to the output end, the elevated region of the housing provides for receptacle region for locating a collection container.

9. The conveyor station of claim 1, wherein a fullness sensor is located proximate to the output end for detecting a level of fullness of said receptacle.

10. The conveyor station of claim 1, wherein said sweeper conveyor is configured with a tilt mechanism to facilitate movement of said debris out of the container of the sweeper.

11. The conveyor station of claim 10, wherein the sweeper conveyor incudes a surface that is one of a smooth surface, a beaded surface, a rough surface, a ridged surface, a fined surface or a surface with geometric structures designed to push said debris out of the container of the sweeper.

12. The conveyor station of claim 1, wherein the sweeper includes one or more blowers of air that are activated to push said debris out of the container of the sweeper and onto said receiving region of the conveyor belt of the conveyor station.

13. A system for autonomously emptying debris, comprising,
a robot;
a sweeper configured for interfacing with the robot, wherein said robot connects to said sweeper and causes said sweeper to operate brushes for sweeping a surface to collect debris in a container of the sweeper;
a docking station for enabling the robot to connect the sweeper with the docking station; and
a conveyor system including a conveyor belt, the conveyor system having an input end that is interfaced with the docking station, such that the sweeper when connected to the docking station is placed adjacent to said conveyor belt, wherein a door of the sweeper is configured to open to enable debris in the container of the sweeper to empty onto the conveyor belt at the input end, the conveyor belt is configured to move debris to an output end so that said debris can be dropped into a receptacle.

14. The system of claim 13, wherein the sweeper includes a sweeper conveyor, the sweeper conveyor is configured for pushing debris out of the container of the sweeper and onto the conveyor belt of the conveyor system.

15. The system of claim 13, wherein the robot includes a robot controller that is interfaced with a sweeper controller of the sweeper, and said sweeper controller is interfaced with a conveyor controller, wherein a power controller of the conveyor system is configured to provide power to the sweeper for charging a battery of the sweeper.

16. The system of claim 13, wherein the conveyor belt of the conveyor system includes a receiving region proximate to the input end and an angled transport region leads toward a dispense region, the conveyor belt having a plurality of fins that extend out from a surface of the conveyor belt, the plurality of fins enable movement of debris collected at the receiving region toward the dispense region, wherein the dispense region is configured to push debris into a drop funnel of a housing of the conveyor system, the drop funnel directs debris into the receptacle.

17. The system of claim 13, wherein a housing of the conveyor system includes a frame and said frame is connected to wheels for movement of the conveyor system to or from a location for operation.

\* \* \* \* \*